(12) United States Patent
Clark et al.

(10) Patent No.: US 7,639,664 B2
(45) Date of Patent: Dec. 29, 2009

(54) DYNAMIC MANAGEMENT OF TRUNK GROUP MEMBERS

(75) Inventors: Edward Alan Clark, Sugar Grove, IL (US); Joseph John Kott, Aurora, IL (US); Peter C. Tomasino, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1278 days.

(21) Appl. No.: 10/449,521

(22) Filed: May 30, 2003

(65) Prior Publication Data

US 2004/0240381 A1 Dec. 2, 2004

(51) Int. Cl.
*H04L 12/66* (2006.01)
(52) U.S. Cl. ..................................... 370/352
(58) Field of Classification Search ......... 370/229–240, 370/468, 216–228, 242, 250, 251, 254, 314, 370/352–386, 395.1–410, 467
See application file for complete search history.

(56) References Cited

U.S. PATENT DOCUMENTS

| 4,870,641 | A  | * | 9/1989  | Pattavina ..................... 370/397 |
| 6,141,342 | A  | * | 10/2000 | Cheesman et al. .......... 370/352 |
| 6,215,765 | B1 |   | 4/2001  | McAllister et al. .......... 370/217 |
| 6,389,130 | B1 |   | 5/2002  | Shenoda et al. ........ 379/221.08 |
| 6,487,168 | B1 |   | 11/2002 | Hamami ..................... 370/216 |
| 6,507,649 | B1 | * | 1/2003  | Tovander .................... 379/230 |
| 6,560,218 | B2 |   | 5/2003  | McAllister et al. .......... 370/351 |
| 6,570,855 | B1 | * | 5/2003  | Kung et al. ................. 370/237 |
| 6,606,310 | B1 | * | 8/2003  | Vialen et al. ................ 370/338 |
| 6,680,943 | B1 | * | 1/2004  | Gibson et al. ............... 370/392 |
| 6,721,322 | B1 | * | 4/2004  | Lakhani et al. .......... 370/395.1 |
| 6,744,768 | B2 | * | 6/2004  | Vikberg et al. ......... 370/395.21 |
| 6,765,912 | B1 | * | 7/2004  | Vuong .................... 370/395.2 |
| 6,922,394 | B2 | * | 7/2005  | Kajiwara .................... 370/238 |
| 7,248,565 | B1 | * | 7/2007  | Fourie ........................ 370/235 |

OTHER PUBLICATIONS

Q.764, Specifications of Signalling System No. 7—ISDN user part, Dec. 1999, ITU-T.*

* cited by examiner

*Primary Examiner*—Kwang B Yao
*Assistant Examiner*—Alex Skripnikov
(74) *Attorney, Agent, or Firm*—Fay Sharpe, LLP

(57) ABSTRACT

A pool of network resources is provided. Traffic volume between switches is monitored. When traffic volume between two switches justifies the allocation of pool resources a switch-to-switch call is made between the two switches. One or more resources from the pool are used to establish the switch-to-switch call. The switch-to-switch call is used to carry call traffic. When traffic volume subsides, the switch-to-switch call is torn down, thereby freeing the one or more resources for use in the dynamic establishment of other switch-to-switch calls between other switch pairs. Switch-to-switch calls are placed ISUP in TDM bearer networks, using SIP or BICC in IP bearer networks and using BICC in ATM bearer networks.

32 Claims, 15 Drawing Sheets

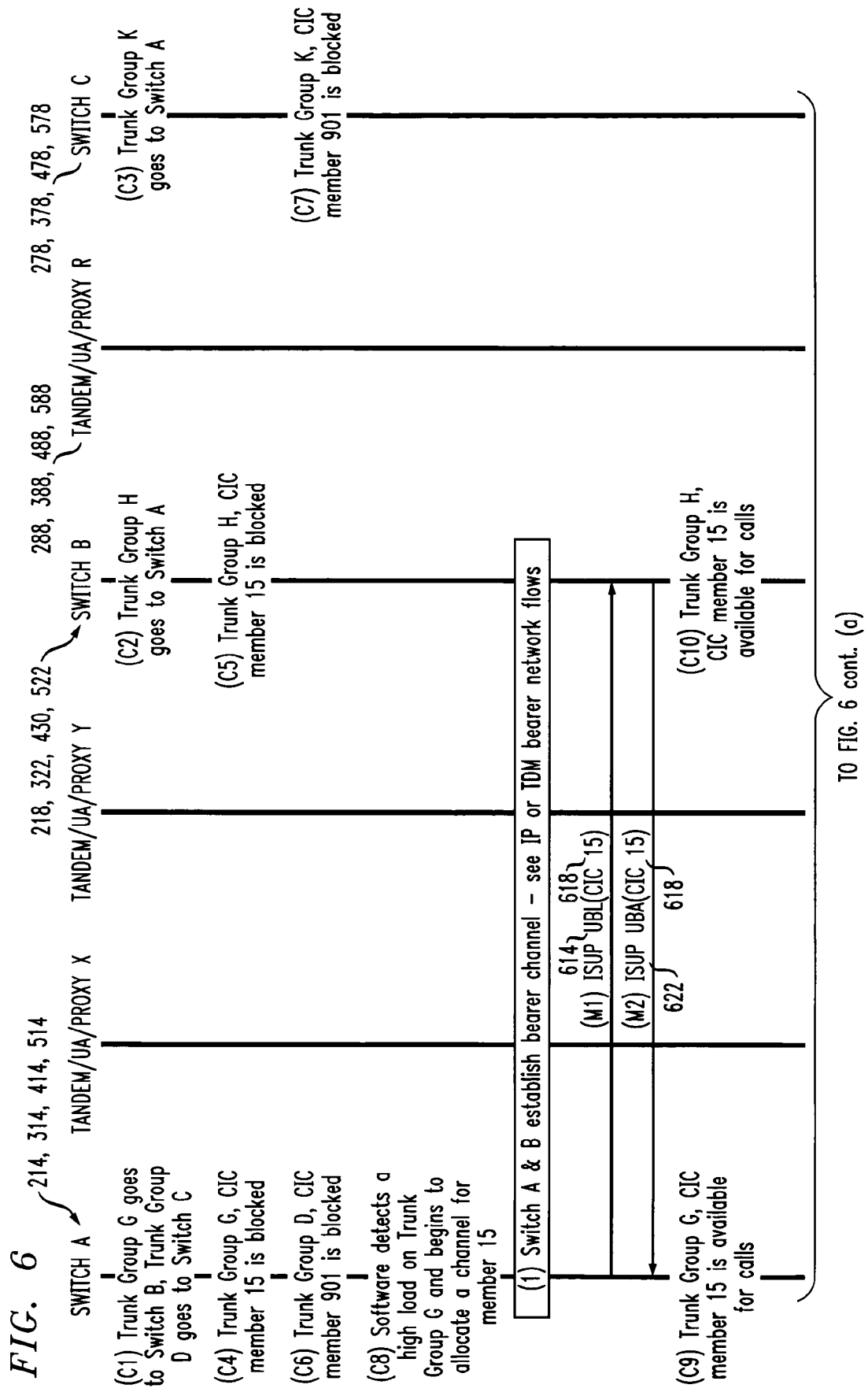

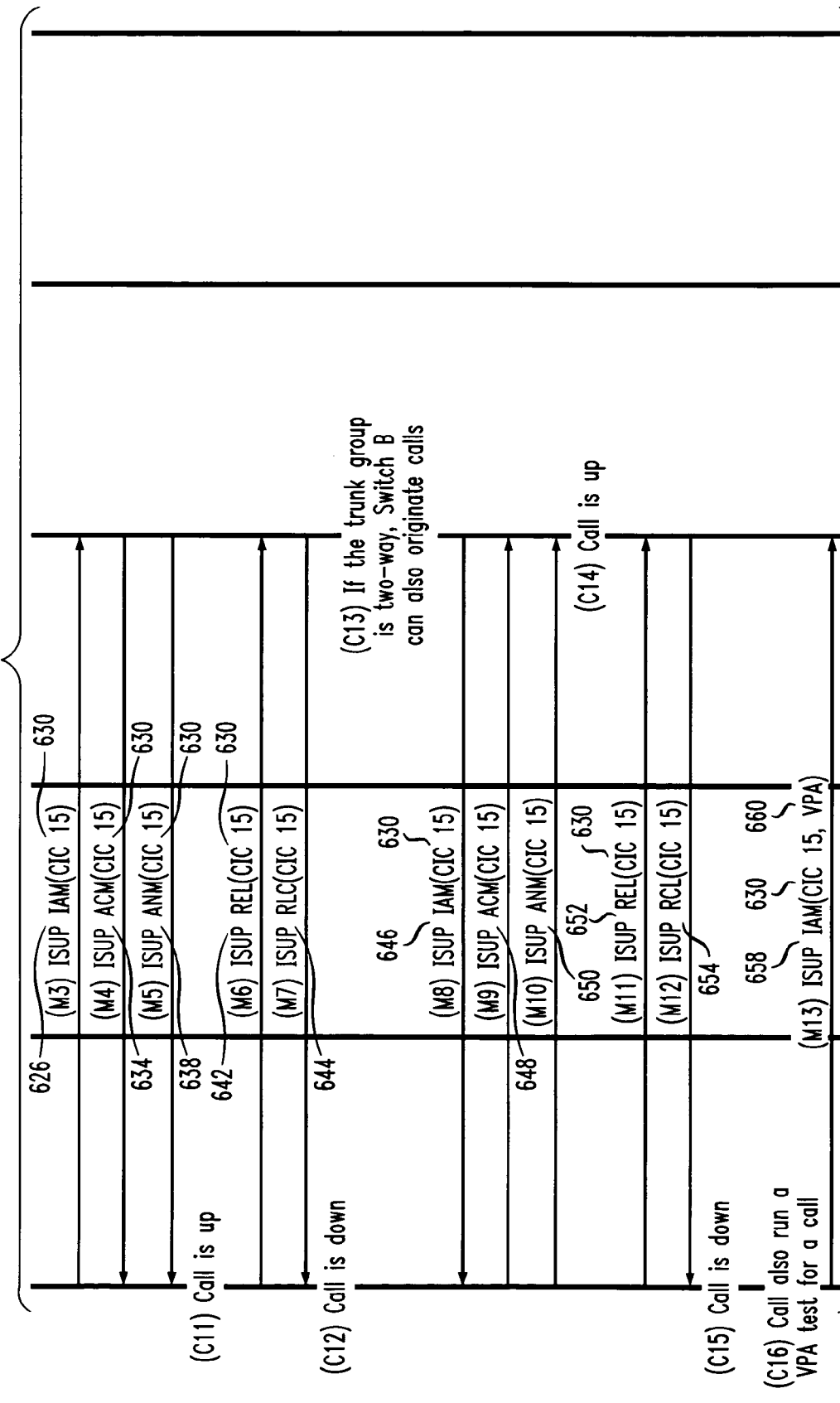
FIG. 6 cont. (a)

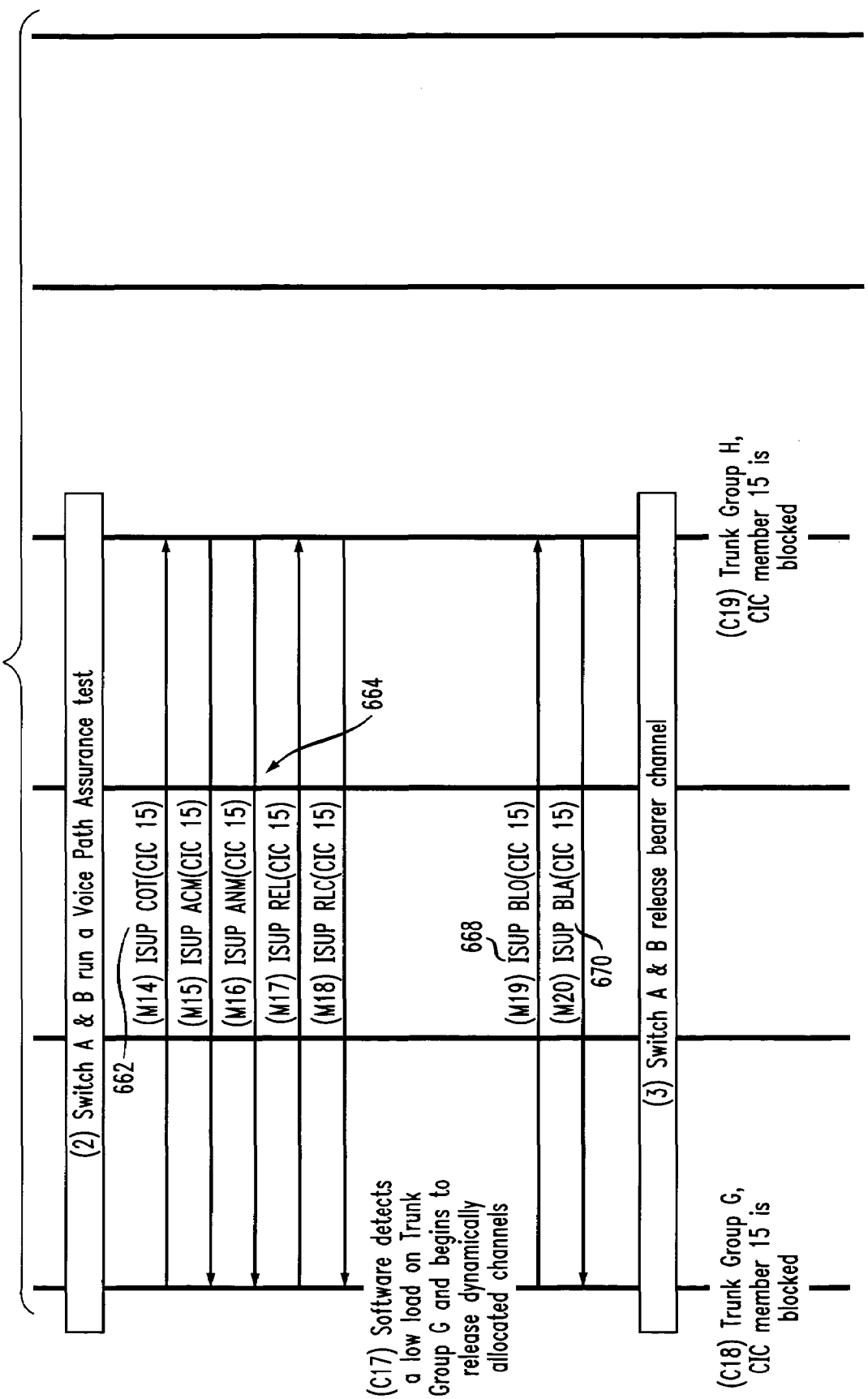
FIG. 6 cont. (b)

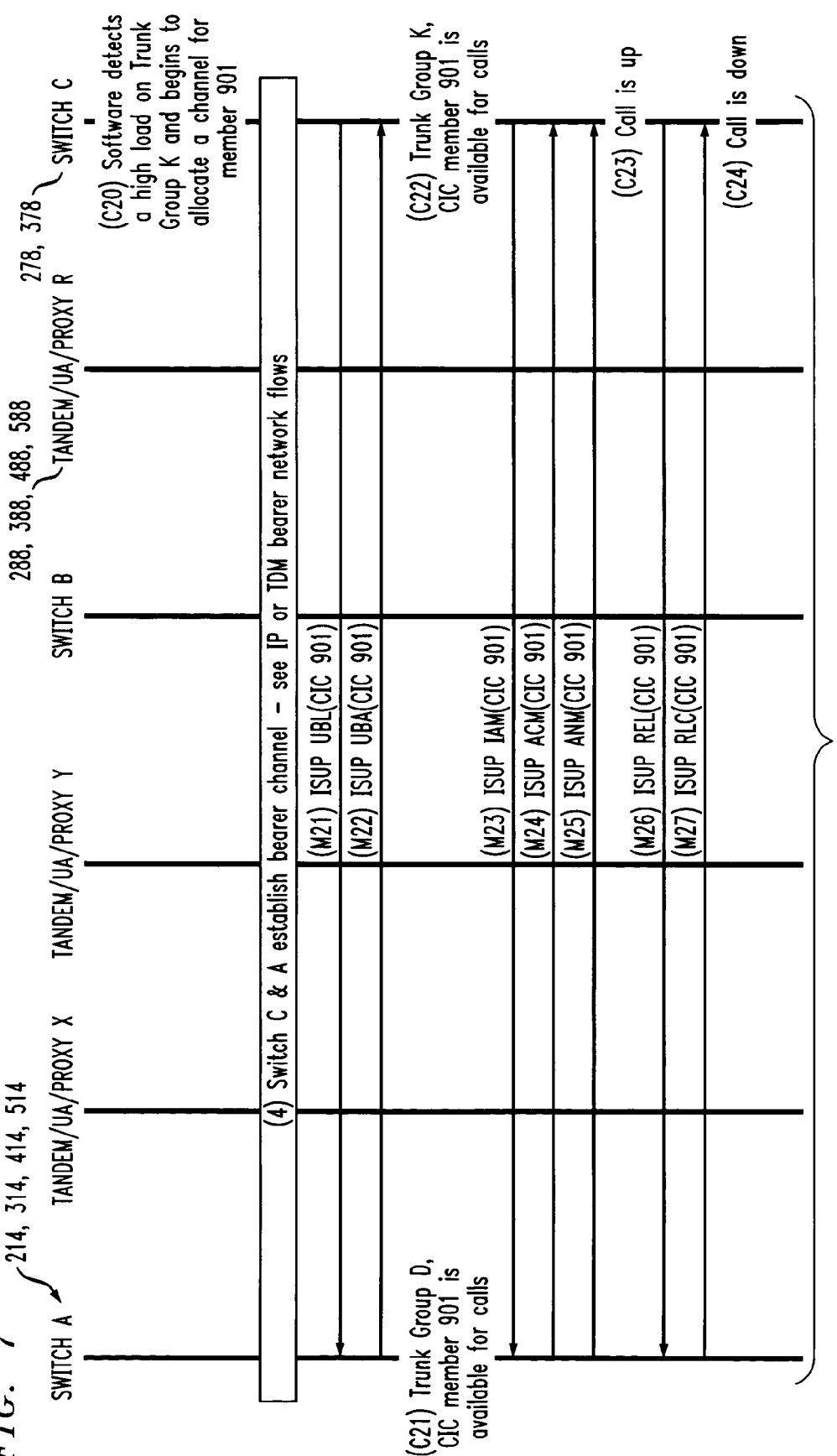

DYNAMIC MANAGEMENT OF TRUNK GROUP MEMBERS

BACKGROUND

The invention is related to the art of dynamic trunk group or bearer path resource allocation in a communications network. The invention will be described, for the most part, in terms of ISUP (Integrated Services Digital Network User Part) trunk group member allocation. However, the invention can be applied to the allocation of communications bandwidth in networks based on other protocols.

A trunk is a communications link between two switches. A trunk can include wired connections, fiber optic connections or other communications links such as an RF or microwave link. A trunk group is a collection or set of trunks that link two geographic points or switches. For example, currently, in some networks, trunk groups include a collection of DS0 (Digital Signal, level 0) channels that interconnect two switches in a given network. A DS0 channel is a 64 KBPS digital communications channel typically used to carry one voice conversation.

In Time Division Multiplexing networks (TDM), trunk groups are defined on a permanent or semi-permanent basis. The number of channels within a given trunk group is engineered to be equal to the maximum number of simultaneous calls expected between two switches served by the trunk group.

Each permanent or semi-permanent DS0 channel or trunk group member requires each of the two switches to dedicate a DS0 interface to that channel or trunk group member. Additionally, other network resources must be dedicated to the trunk group member. For example, proxies or tandems that are used to interconnect the two switches must dedicate interconnecting hardware and interconnecting wire or fiber to connect the two DS0 interfaces.

Since these channels are set up on a permanent or semi-permanent basis, during low traffic periods, a significant number of switch and network resources are idle and cannot be used for any other purpose. This represents a significant waste of network resources.

Furthermore, as network traffic patterns change, the permanent or semi-permanent nature of the provisioning of trunk groups and trunk group members means that present telephony networks are slow to react. For instance, when traffic conditions change and the peak traffic volume increases beyond the current capacity of a trunk group, craft personnel must take manual action to reprovision network resources to increase the size of the trunk group in order to accommodate the increased demand. The time required to alert craft personnel to the overload and for the craft personnel to resolve the situation can lead to dropped calls and delayed connections. Similar delays in reallocating resources occur when traffic between the switches diminishes.

Therefore, there is a desire for a method and system for dynamically managing or allocating switch interfaces and network resources from a common pool of available interfaces and network resources.

SUMMARY

A method for real time trunk member allocation includes monitoring traffic volume between a local switch and a first remote switch, determining that traffic volume between the local switch and the first remote switch justifies allocating additional trunk resources between the local switch and the first remote switch, dynamically selecting a first trunk member between the local switch and the first remote switch, dynamically negotiating a first bearer path between the local switch and the first remote switch through a first set of bearer resources including a dynamically allocatable bearer resource in response to the determined justification, associating the negotiated first bearer path to the first selected trunk member, and, marking the selected first trunk member as available for use.

The method can also include determining that the traffic volume between the local switch and the first remote switch no longer justifies allocating the additional trunk resources between the local switch and the first remote switch, marking the first selected trunk member as unavailable for use, and, dynamically tearing down the first bearer path associated with the first selected trunk member, thereby freeing the dynamically allocatable bearer resource for dynamic reallocation.

Additionally, the method can include monitoring traffic volume between the local switch and a second remote switch, determining that the traffic volume between the local switch and the second remote switch justifies allocating additional trunk resources between the local switch and the second remote switch, dynamically selecting a second trunk member between the local switch and the second remote switch, dynamically negotiating a second bearer path between the local switch and the second remote switch through a second set of bearer resources including the dynamically allocatable resource, associating the negotiated second path to the second selected trunk member, and, marking the negotiated second trunk member as available for use.

Furthermore, the method can include determining that the traffic volume between the local switch and the second remote switch no longer justifies allocating the additional trunk resources between the local switch and the second remote switch, marking the negotiated second trunk member as unavailable for use, and, dynamically tearing down the associated second bearer path, thereby freeing the trunk resource for dynamic reallocation.

Dynamically negotiating can include transmitting a message requesting the establishment of a switch-to-switch call through the dynamically allocatable bearer resource.

For example, transmitting a message requesting the establishment of a switch-to-switch call can include transmitting a first ISUP IAM message including a directory number associated with the remote switch. The directory number can also be associated with the remote switch and associated with a real time trunk allocation function.

In some embodiments transmitting a message requesting the establishment of a switch-to-switch call can include transmitting a SIP INVITE message including an address designating the remote switch. In some embodiments transmitting a message requesting the establishment of a switch-to-switch call can include transmitting a BICC IAM message including an address designating the remote switch. In some embodiments transmitting a message requesting the establishment of a switch-to-switch call can include transmitting an ATM UNI SETUP message.

Marking the negotiated first member as available for use can include transmitting an ISUP UBL message Some implementations embody a method for dynamic trunk member allocation including monitoring traffic volume between a local switch and a first remote switch, determining that traffic volume between the local switch and the first remote switch justifies allocating additional trunk resources between the local switch and the first remote switch, placing a switch to switch call between the local switch and the first remote switch, and, transmitting an ISUP UBL message in association with a CIC number related to the member, thereby marking a first member as available for use.

The method can further include determining that the traffic volume between the local switch and the first remote switch no longer justifies allocating the additional trunk resources between the local switch and the first remote switch, transmitting an ISUP BLO message in association with the CIC number related to the member, thereby marking the first member as unavailable for use, and, dynamically tearing down the first bearer path, thereby freeing the dynamically allocatable bearer resource for dynamic reallocation.

Additionally, the method can include monitoring traffic volume between the local switch and a second remote switch, determining that the traffic volume between the local switch and the second remote switch justifies allocating additional trunk resources between the local switch and the second remote switch, placing a switch to switch call between the local switch and the second remote switch and, transmitting an ISUP UBL message in association with a CIC number related to the member, thereby marking a second member as available for use.

Placing a switch-to-switch call between the local switch and the first remote switch can include transmitting an ISUP IAM message from the local switch to the first remote switch or to an intervening network element, the ISUP IAM message including a directory number of the remote switch and a CIC number associated with the member.

In some embodiments placing a switch-to-switch call between the local switch and the first remote switch comprises transmitting an SIP INVITE message from the local switch to the first remote switch, the SIP INVITE message including a network address of the remote switch and a CIC number associated with the member.

In some embodiments placing a switch-to-switch call between the local switch and the first remote switch comprises transmitting an BICC IAM message from the local switch to the first remote switch, the BICC IAM message including a network address of the remote switch and a CIC number associated with the member. In some embodiments the BICC IAM message including a network address of the remote switch and an ATM address associated with the resource.

Generally, a system for real time trunk member allocation includes means for monitoring traffic volume between a local switch and a first remote switch, means for determining that traffic volume between the local switch and the first remote switch justifies allocating additional trunk resources between the local switch and the first remote switch, means for selecting a first trunk member between the first local switch and the first remote switch, means for dynamically negotiating a first bearer path between the first local switch and the first remote switch through a first set of bearer resources including a dynamically allocatable bearer resource in response to the determined justification, means for associating the first selected trunk member to the negotiated first bearer path, and, means for marking the selected first trunk member as available for use.

Some embodiments include means for determining that the traffic volume between the local switch and the first remote switch no longer justifies allocating the additional trunk resources between the local switch and the first remote switch, means for marking the negotiated first trunk member as unavailable for use, and, means for dynamically tearing down the first bearer path, thereby freeing the dynamically allocatable bearer resource for dynamic reallocation.

Additionally, some embodiments include means for monitoring traffic volume between the local switch and a second remote switch, means for determining that the traffic volume between the local switch and the second remote switch justifies allocating additional trunk resources between the local switch and the second remote switch, means for selecting a second trunk member between the local switch and the second remote switch, means for dynamically negotiating a second bearer path between the local switch and the second remote switch through a second set of bearer resources including the dynamically allocatable resource, means for associating the second selected trunk member to the negotiated second bearer path, and, means for marking the selected second trunk member as available for use.

Furthermore, some embodiments include means for determining that the traffic volume between the local switch and the second remote switch no longer justifies allocating the additional trunk resources between the local switch and the second remote switch, means for marking the negotiated second trunk member as unavailable for use, and, means for dynamically tearing down the second bearer path, thereby freeing the dynamically allocatable bearer resource for dynamic reallocation.

The means for dynamically negotiating a first bearer can include means for transmitting a message requesting the establishment of a switch-to-switch call through the dynamically allocatable bearer resource. The means for transmitting a message requesting the establishment of a switch-to-switch call can include means for transmitting a first ISUP LAM message including a directory number associated with the remote switch. The means for transmitting a message requesting the establishment of a switch-to-switch call can include means for transmitting a first ISUP IAM message including a directory number associated with the remote switch and associated with a real time trunk allocation function. The means for transmitting a message requesting the establishment of a switch-to-switch call can include means for transmitting a SIP INVITE message including an address designating the remote switch and/or means for transmitting a BICC IAM message including an address designating the remote switch and/or means for transmitting a ATM UNI SETUP message.

Some systems are operative to dynamically manage a trunk member and include a bearer layer signaling network, a switching element connected to a bearer resource and a plurality of additional bearer resources and the bearer layer signaling network, a database associating each of the additional trunk members with at least one remote switch, the database also associating the switching element with a trunk member label identifying the trunk member and a status parameter, a bearer layer communications element operative to transmit and receive signaling messages to and from a bearer layer signaling network, the signaling messages communicating information related to a switch state of the switching element, a call layer communications element operative to transmit and receive signaling messages to and from a remote switch, the signaling messages communicating information related to values of the status parameters, and, an information processor connected to the database, the bearer layer communications element and the call layer communications element, the information processor being operative to send and/or receive a message to and/or from a remote switch through services of the bearer layer or call layer communications element the message being associated with the trunk member label, and control the switching element through services of the bearer layer communications element to associate or disassociate the trunk member to or from one of the additional bearer resources.

Some embodiments include a traffic monitor operative to monitor a traffic load on a plurality of trunk members, wherein the information processor is further connected to the traffic monitor, the information processor being operative to receive a traffic report from the traffic monitor and determine if a traffic load on one or more trunk resources is above a threshold and, if the traffic load is above the threshold, select a trunk member to use; select the bearer resource to share the traffic load of the one or more trunk resources, send one or more messages to a remote switch associated with the one or more trunk resources and to network elements associated with a bearer path between the local switch and the remote switch, the one or more messages including a trunk member label associated with the remote switch, the one or more messages directing the remote switch and the network elements to establish the bearer path through the bearer resource, the switching element and at least one of the additional bearer resources, and/or directing the remote switch to update a status parameter of the trunk member to a value of active or unblocked.

The information processor can be further operative to receive the traffic report from the traffic monitor and determine if the traffic load on the plurality of resources is below a second threshold and if the traffic load is below the second threshold, selecting the trunk member to be removed from the plurality of trunk members, send one or more messages to the remote switch and any network elements associated with the path between the local switch and the remote switch, the one or more messages including the trunk member label associated with the remote switch and/or directing the remote switch to change the status parameter associated with the trunk member associated with the remote switch to an inactive or blocked state, and directing the switching element and the network elements associated with the bearer path to disconnect the bearer resource and the at least one additional bearer resource from the path.

In some embodiments the information processor is operative to send and/or receive a ISUP IAM or REL message to and/or from a remote switch through services of the bearer layer communications element, the message being associated with the bearer resource, and control the switching element to connect or disconnect the bearer resource to one of the additional bearer resources as at least part of a path to the remote switch.

In some embodiments the information processor is operative to send and/or receive a SIP INVITE or BYE message to and/or from a remote switch through services of the bearer layer communications element, the message being associated with the bearer resource, and control the switching element to connect or disconnect the bearer resource to one of the additional bearer resources as at least part of a path to the remote switch.

In some embodiments the information processor is operative to send and/or receive a BICC IAM or REL message to and/or from a remote switch through services of the bearer layer communications element, the message being associated with the bearer resource, and control the switching element to connect or disconnect the bearer resource to one of the additional bearer resources as at least part of a path to the remote switch. In some of these embodiments the information processor is operative to send and/or receive a ATM UNI SETUP message to and/or from a remote switch through services of the bearer layer communications element, the message being associated with the bearer resource.

BRIEF DESCRIPTION OF THE DRAWINGS

The invention may take form in various components and arrangements of components, and in various procedures and arrangements of procedures. The drawings are only for purposes of illustrating preferred embodiments and are not to be construed as limiting the invention. Further, it is to be appreciated that the drawings are not to scale.

FIG. 6 is a call flow diagram outlining call placement over a dynamically established path between a local switch and a first remote switch.

DETAILED DESCRIPTION OF PREFERRED EMBODIMENTS

Figure 1:
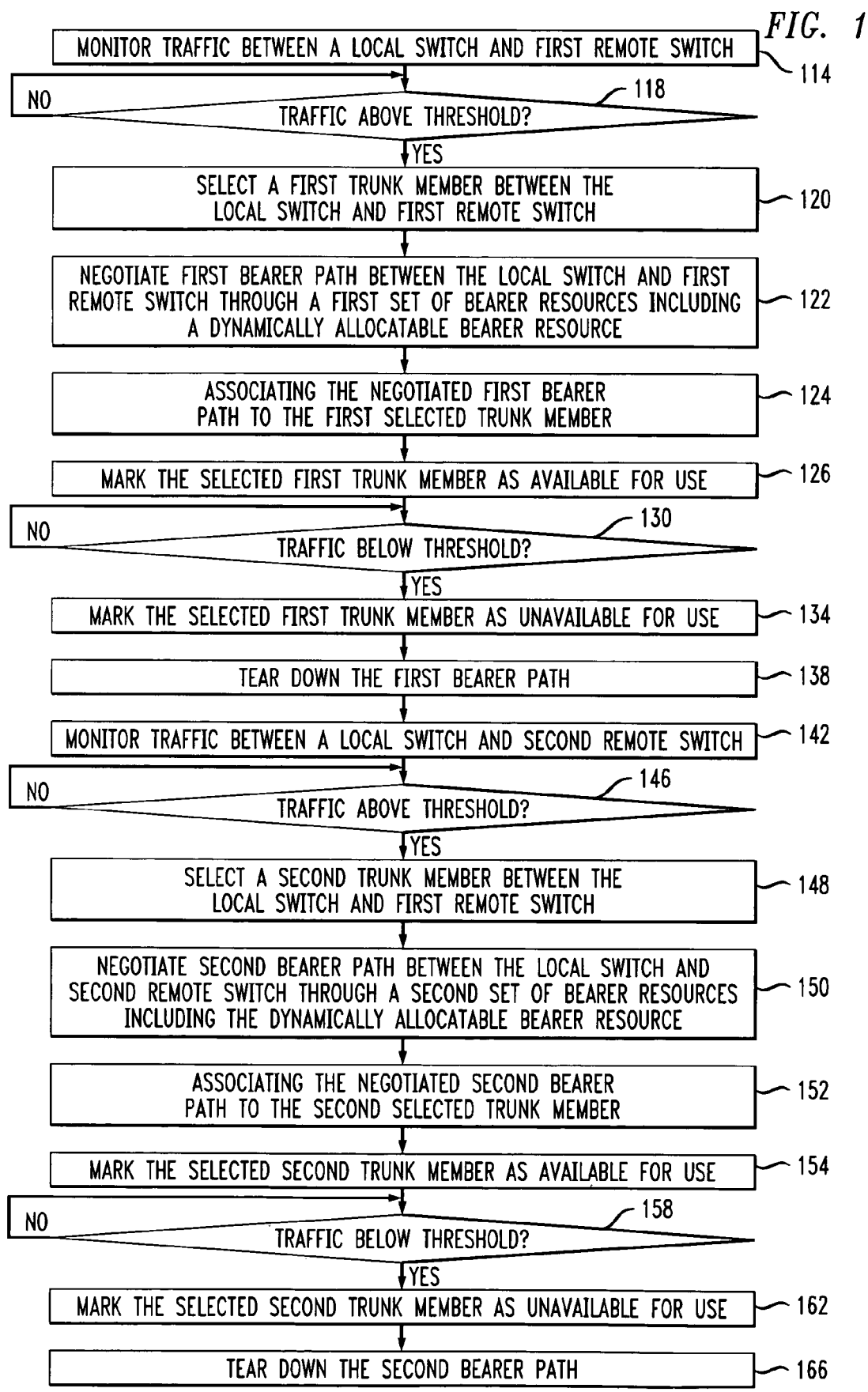
FIG. 1 is a flow chart outlining a method for dynamically managing, allocating or provisioning a network trunk or bearer resource.

Referring to FIG. 1, a method 110 for dynamically allocating or managing a network trunk member can include monitoring 114 traffic between a local switch and a first remote switch, determining 118 whether or not the traffic volume is above a first threshold, and if it is above a first threshold, selecting 120 a first trunk member between the local switch and the first remote switch, negotiating 122 a first bearer path between the local switch and the first remote switch using a dynamically allocated or managed bearer resource. Once the negotiated path is established, the path can be associated 124 with the first selected trunk member and the selected trunk member marked 126 as available for use. The method 110 can further include determining 130 if the volume of traffic between the local switch and the first remote switch has fallen below the first threshold. If the traffic has fallen below a threshold, the selected trunk member is marked 134 as being unavailable for use and the bearer path is torn down 138. This leaves the dynamically allocatable bearer resource available for use in completing another path.

For example, traffic between the local switch and a second remote switch is also monitored 142. A determination 146 is made as to whether or not the traffic between the local switch and the second remote switch is above a second threshold. If traffic volume between the local switch and the second remote switch is above the second threshold value, a second trunk member between the local switch and the second remote switch is selected 148 and a second path between the local switch and the second remote switch including the resource is negotiated 150. When the second path is set up, it is associated 152 with the second selected trunk member and that selected trunk member is marked 154 as available for use. If traffic between the local switch and the second remote switch is determined 158 to have fallen below the second threshold, the second selected trunk member is marked 162 as being unavailable for use and the second negotiated path is torn down 166 making the dynamically allocatable bearer resource once again available for dynamic reallocation.

Of course, hysteresis or filtering or averaging techniques may be applied to the first and second threshold determinations to prevent or lessen oscillation in the dynamic resource allocation system.

The method 110 for dynamically allocating or managing a network trunk member can be performed in a wide variety of ways and by a wide variety of hardware and software combinations. For the most part, embodiments described below locate method 110 functionality in switches. However, it is to be understood that method 110 functionality may be implemented in other devices, such as, for example, intermediate network elements.

The dynamically negotiated bearer resource mentioned above can be, for example, a DS0 channel or a portion thereof. For instance, the resource can be a DS0 interface within the local switch, within the remote switch, or within or between intermediate network elements associated with the path. Additionally, or alternatively, the resource can include a trunk member such as a wire, a wire pair, a fiber optic cable, a microwave channel, or other communications link.

Marking 126, 154 the selected trunk member available for use can include setting a parameter in the local and/or remote switch or databases associated therewith indicating that the resource is available to carry a call.

Negotiating 122, 150 a bearer path using the resource, between the local switch and a remote switch, can include, for example, transmitting a message requesting the establishment of a switch-to-switch call, the message specifying that the resource be used in establishing the call. For example, the resource may be identified by a Circuit Identification Code (CIC) number, IP address or other address or label.

Figure 2:
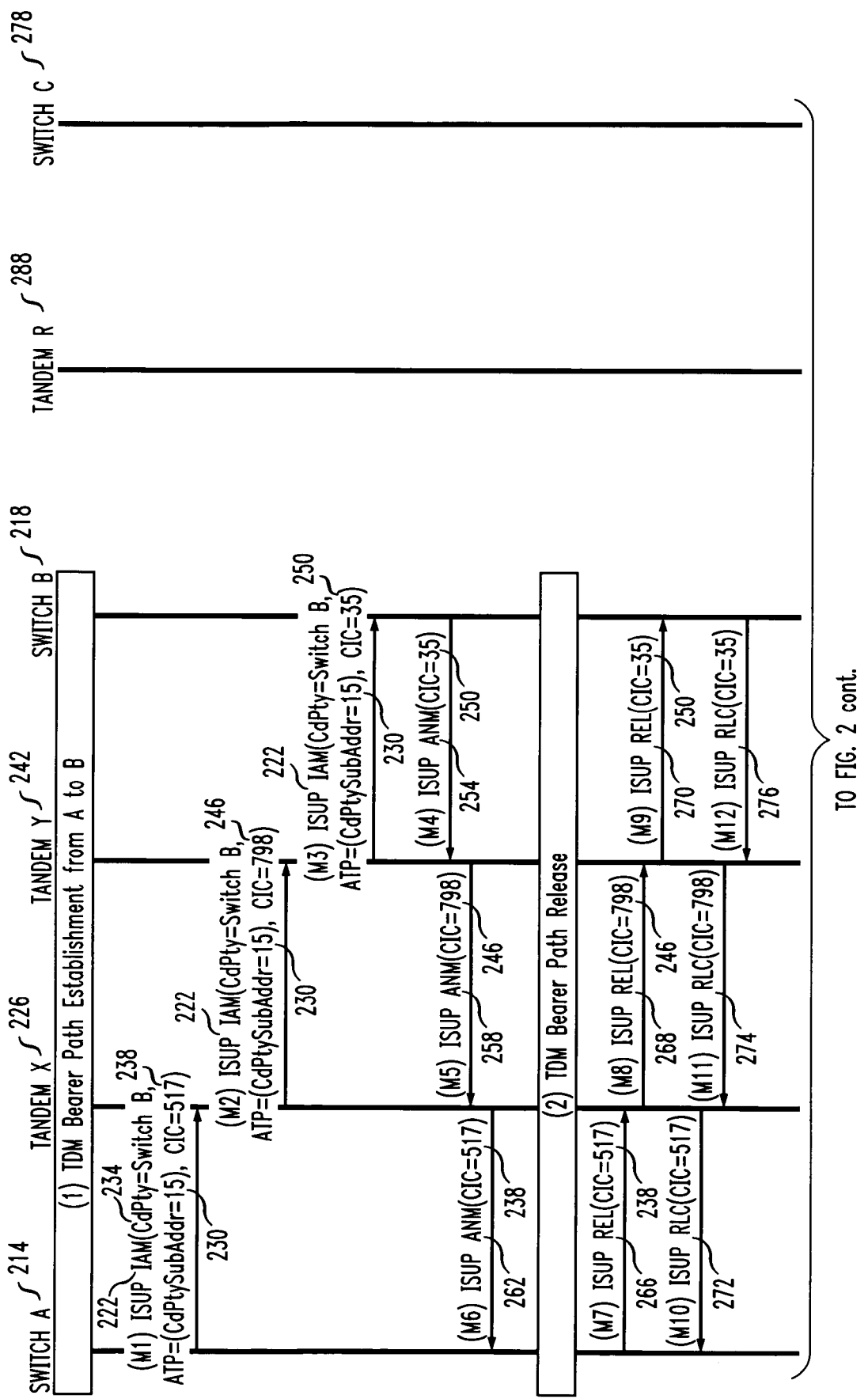
FIG. 2 is a call flow diagram summarizing dynamic bearer path establishment and tear down using ISUP in a TDM bearer network.
Figure 2:
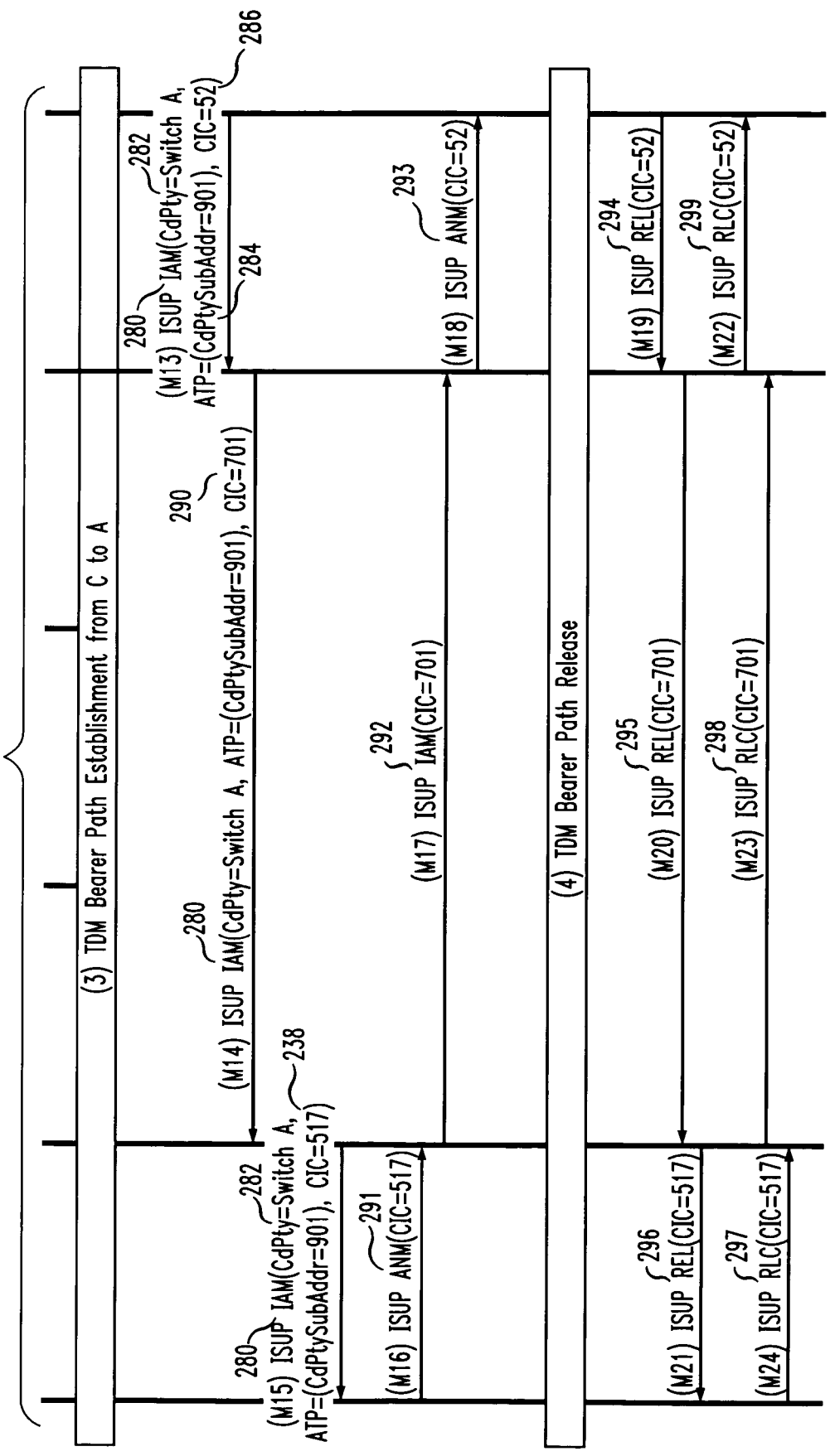

For instance, referring to FIG. 2, where a bearer network is a Time Division Multiplexing (TDM) bearer network negotiating 122 a path between a local switch 214 and a remote switch 218 includes requesting the establishment of a switch-to-switch call between the local switch 214 and the remote switch 218.

For example, a first ISUP IAM (Initial Address) message 222 is transmitted by the local switch 214. The first ISUP IAM message 222 can be transmitted, for example, to an intermediate network element 226 as shown in FIG. 2.

The first ISUP IAM message 222 includes a reference to at least one trunk member that is being dynamically managed or allocated. For example, the first ISUP IAM message includes a reference 230 to a first CIC (Circuit Identification Code) number or called party sub-address. The CIC number or called party sub-address is a logical reference for a trunk member being dynamically allocated or provisioned.

The first ISUP IAM message 222 also includes a reference 234 to a directory number associated with the remote switch 218. The reference 234 to the remote switch 218 directory number can identify the first ISUP IAM message 222 as a request for a switch-to-switch call.

Switch-to-switch calls were contemplated as a means to accommodate number portability. However, switch-to-switch calls are used here as a means to establish a bearer path over at least one dynamically managed or provisioned bearer resource. Once established, the bearer path can be used to carry a plurality of calls. Therefore, the particular directory number referred to by the directory number reference 234, or some other message element, can identify the first ISUP IAM message 222 as being associated with dynamic resource allocation (as opposed, for example, to directory number portability). That is, in a number portability application, an ISUP IAM message would refer to a different directory number. The called switch may invoke certain processes based on a recognition of the message purpose identifier.

A second CIC number 238 is transmitted along with the first ISUP IAM message 222. The second CIC number 238 references an additional bearer resource that can be used to complete the bearer path between the local switch 214 and the remote switch 218. For example, the second CIC number 238 may reference a first bearer resource and/or DS0 interface that can be used to interconnect the local switch 214 with the first intermediate network element 226. The additional resource referenced by the second CIC number 238 may also be associated with a dynamically managed, provisioned or allocated resource.

The first intermediate network element 226 may be, for example, a Tandem "X", and may relay the first ISUP IAM message directly to the remote switch 218 or, as illustrated in the exemplary scenario, to a second intermediate network element 242 (e.g., another Tandem "Y"). When the first intermediate network element 226 relays the first ISUP IAM message, the second CIC number 238 is not retransmitted. Instead, a third CIC number 246 is transmitted along with the first ISUP IAM message 222. The third CIC number 246 is a reference to an additional bearer resource that can be used to establish a path between the local switch 214 and the first remote switch 218. For example, the third CIC number 246 refers to an interface in the second intermediate network element 242 and/or a bearer resource interconnecting the first intermediate network element 226 and the second intermediate network element 242. The third CIC number 246 may also be associated with a dynamically managed, provisioned or allocated bearer resource.

The second intermediate network element 242 can relay the first ISUP IAM message 222 to yet another intermediate network element or, as shown in the exemplary scenario of FIG. 2, can relay the first ISUP IAM message 222 directly to the remote switch 218. When the second intermediate network element relays the first ISUP IAM message, the third CIC number 246 is not transmitted. Instead, a fourth CIC number 250 is transmitted along with the first ISUP IAM message 222. The fourth CIC number 250 refers to yet another bearer resource that can be used in the path between the local switch 214 and the remote switch 218.

The fourth CIC number 250 is used by the remote switch to associate the bearer resource to the trunk member labeled by the first CIC number 230. For instance, trunk member labeled by the first CIC number 230 and bearer resource labeled by the fourth CIC number 250 are associated to each other within the remote switch 218.

If the remote switch 218 is able to comply with the request to establish a switch-to-switch call, the remote switch 218 sends a first ISUP ANM (Answer) message 254 to the network element it received the request from. For example, the remote switch 218 sends the first ISUP ANM message 254 to the second intermediate network element 242. The first ISUP ANM message 254 includes a reference to the fourth CIC number 250 and confirms that a connection will be established between the second intermediate network element 242 and the remote switch 218 using the bearer resource referenced by the fourth CIC number 250. The second intermediate network element 242 in turn transmits a second ISUP ANM message 258 to the network element it received the first ISUP IAM message 222 from. For example, the second intermediate network element 242 transmits the second ISUP ANM message 258 to the first intermediate network element 226. The second ISUP ANM message 258 includes a reference to the third CIC number 246 and confirms that the bearer resource referenced by the third CIC number 246 will be used to establish a connection between the first intermediate network element 226 and the second intermediate network element 224.

In turn, the first intermediate network element 226 transmits a third ISUP ANM message 262 to the local switch 214. The third ISUP ANM message 262 includes a reference to the second CIC number 238 and confirms that a connection will be established using the bearer resource referenced by the second CIC number 238, thereby establishing the requested bearer path between the local switch 214 and the remote switch 218.

Figure 3:
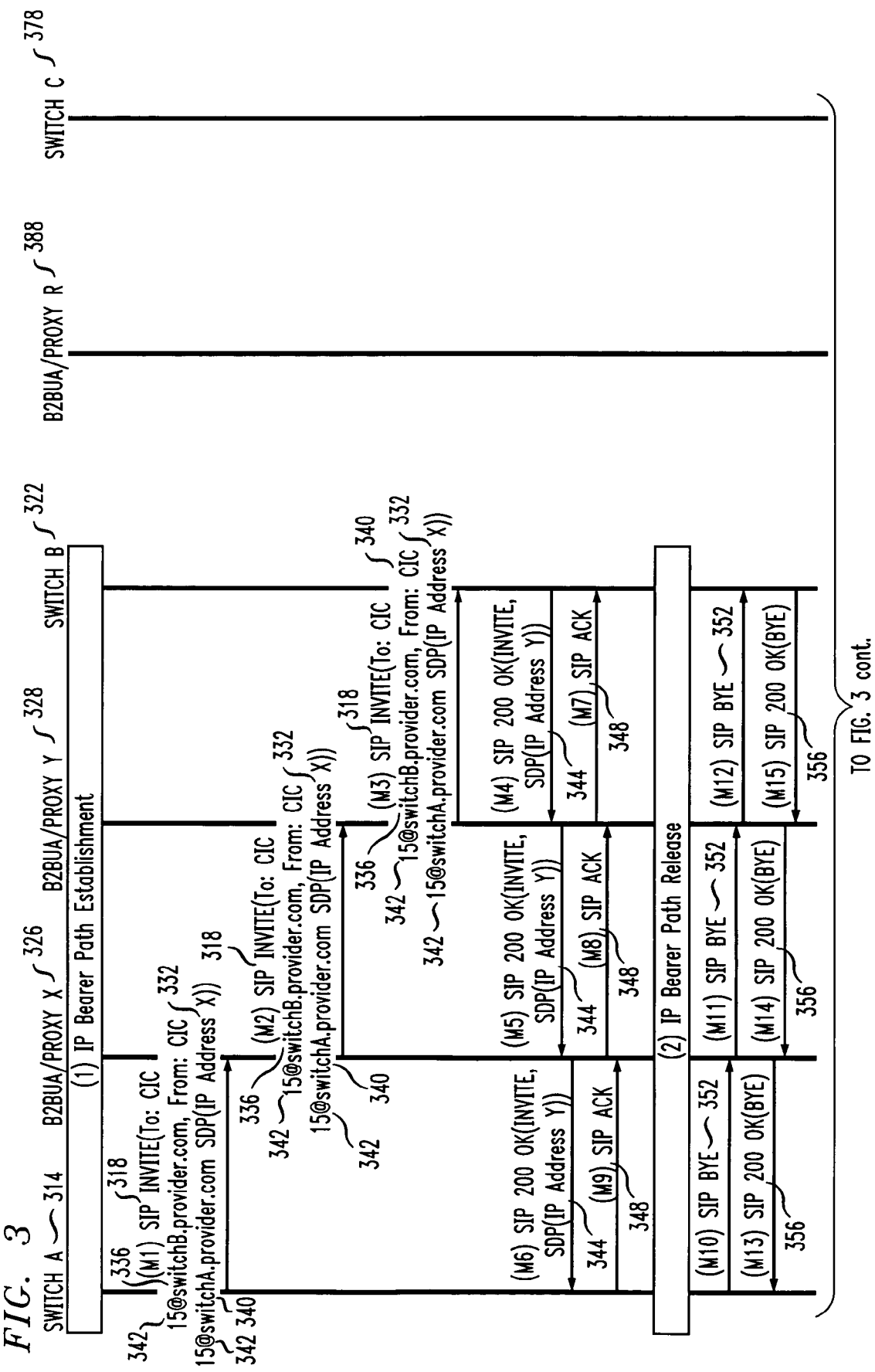
FIG. 3 is a call flow diagram summarizing dynamic bearer path establishment using SIP in an IP bearer network.
Figure 3:
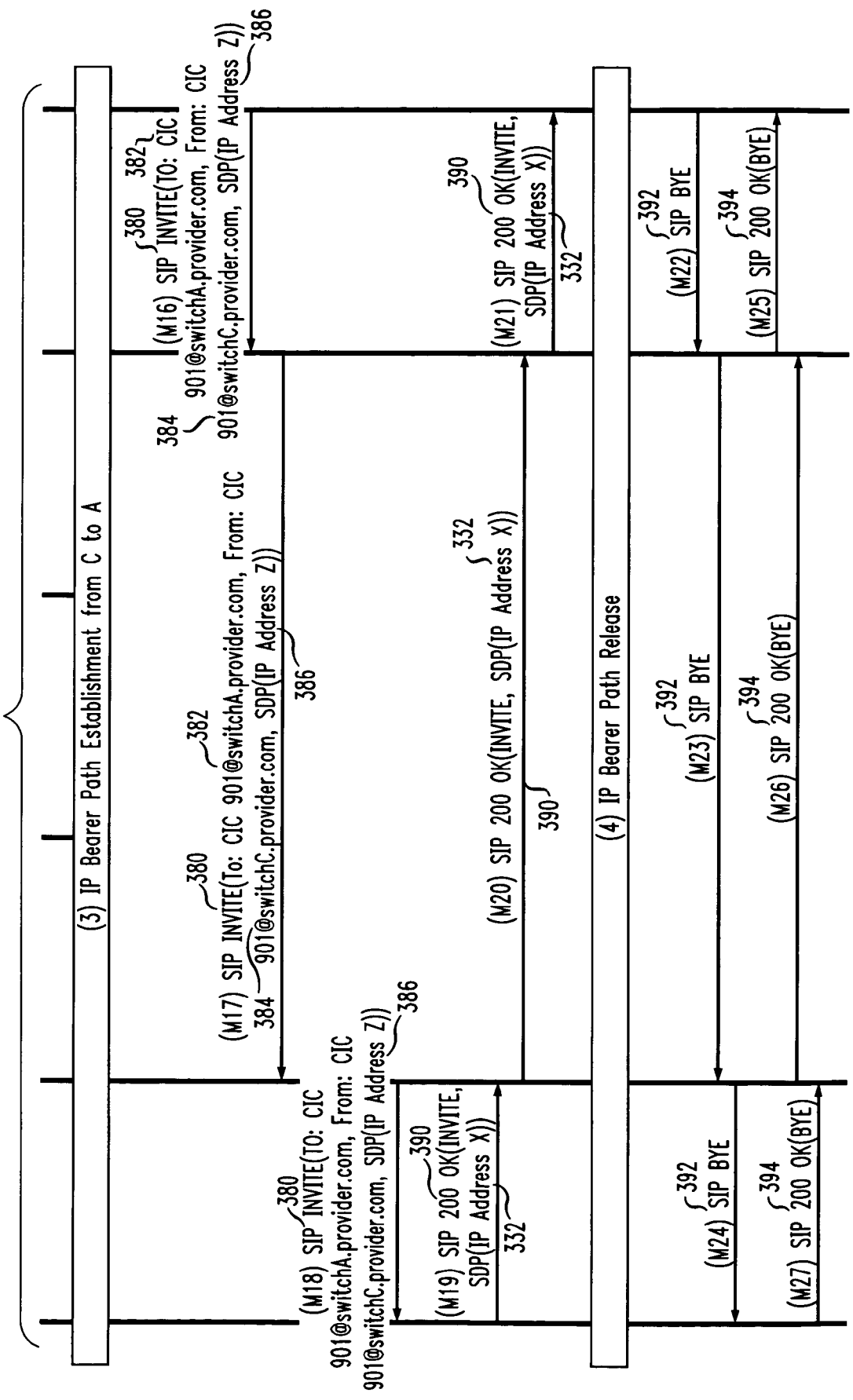

Referring to FIG. 3, where the bearer network is an IP bearer network using the Session Initiation Protocol (SIP), path negotiation 122, 150 takes the form of a switch-to-switch call request made via a SIP INVITE message. For example, a local switch 314 transmits a SIP INVITE message 318 to a first remote switch 322. The SIP INVITE message 318 is relayed by intermediate network elements 326, 328 (e.g., back-to-back user agents or proxies). The SIP INVITE message 318 includes a reference to a bearer resource being dynamically allocated or provisioned. For example, the SIP INVITE message 318 includes a first IP address 332. For example, the first IP address 332 is associated with an interface in the local switch 314. The SIP INVITE message 318 also includes an address 336 associated with the remote switch 322 and an address 340 associated with the local switch 314. The remote switch address 336 and/or the local switch address 340 can indicate to the remote switch that the request for a switch-to-switch call is for the purpose of dynamically allocating or provisioning a bearer path between the switches 314, 322. The switch addresses 336, 340 also includes a trunk member label 342 (e.g., a CIC number) to be used to identify the requested trunk member during subsequent call processing.

If the remote switch 322 is able to comply with the request, the remote switch 322 transmits a SIP 200 OK message 344 back through the network elements (e.g., 326, 328) that relayed the SIP INVITE message 318. The network elements relay the SIP 200 OK message 344 to the local switch 314. Additionally, in response to the SIP 200 OK message, the local switch 314 and network elements (e.g., 326, 328) transmit and/or relay a SIP ACK message 348 to the remote switch 322.

Figure 4:
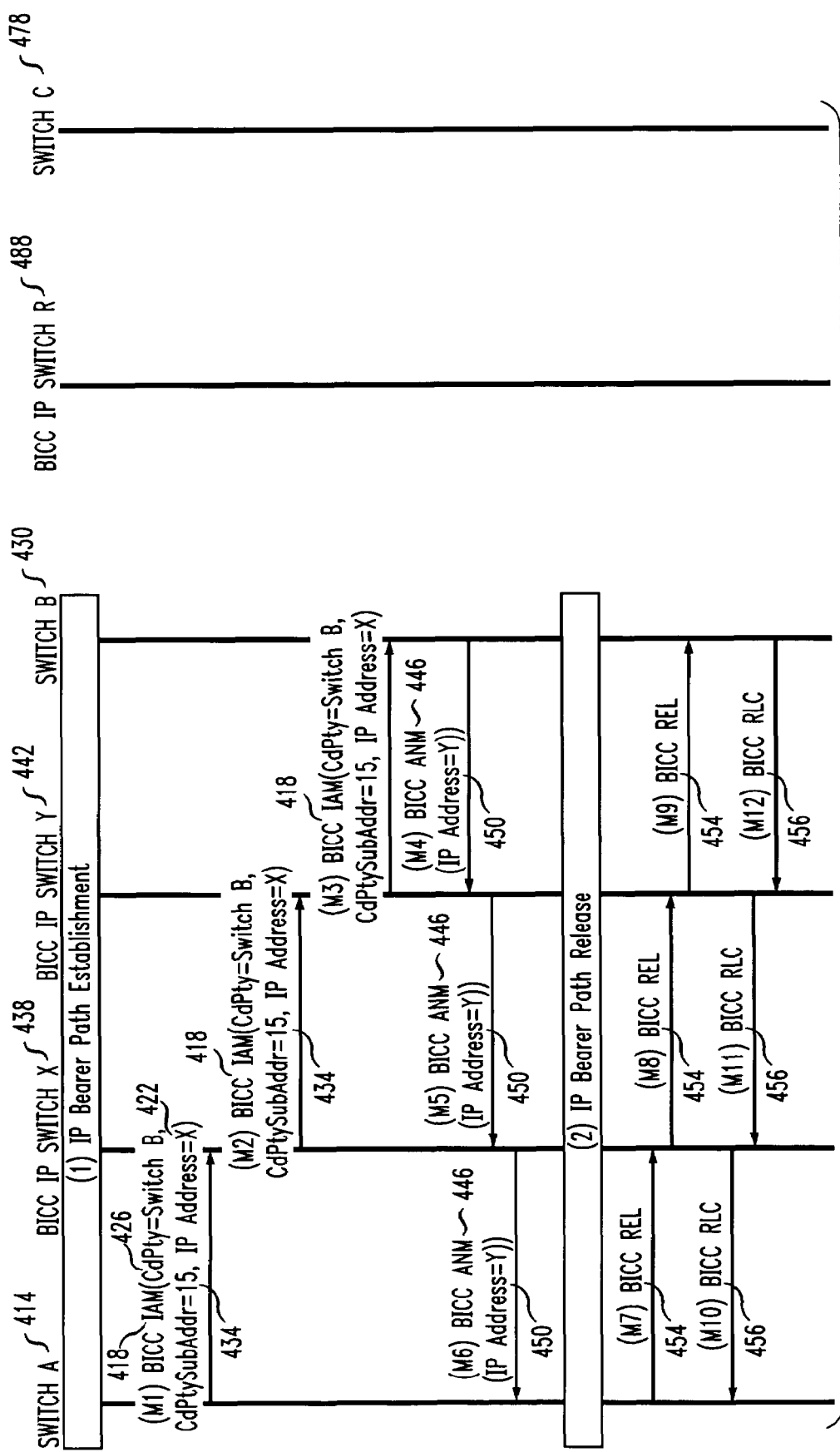
FIG. 4 is a call flow diagram summarizing dynamic bearer path establishment and tear down using BICC in an IP bearer network.
Figure 4:
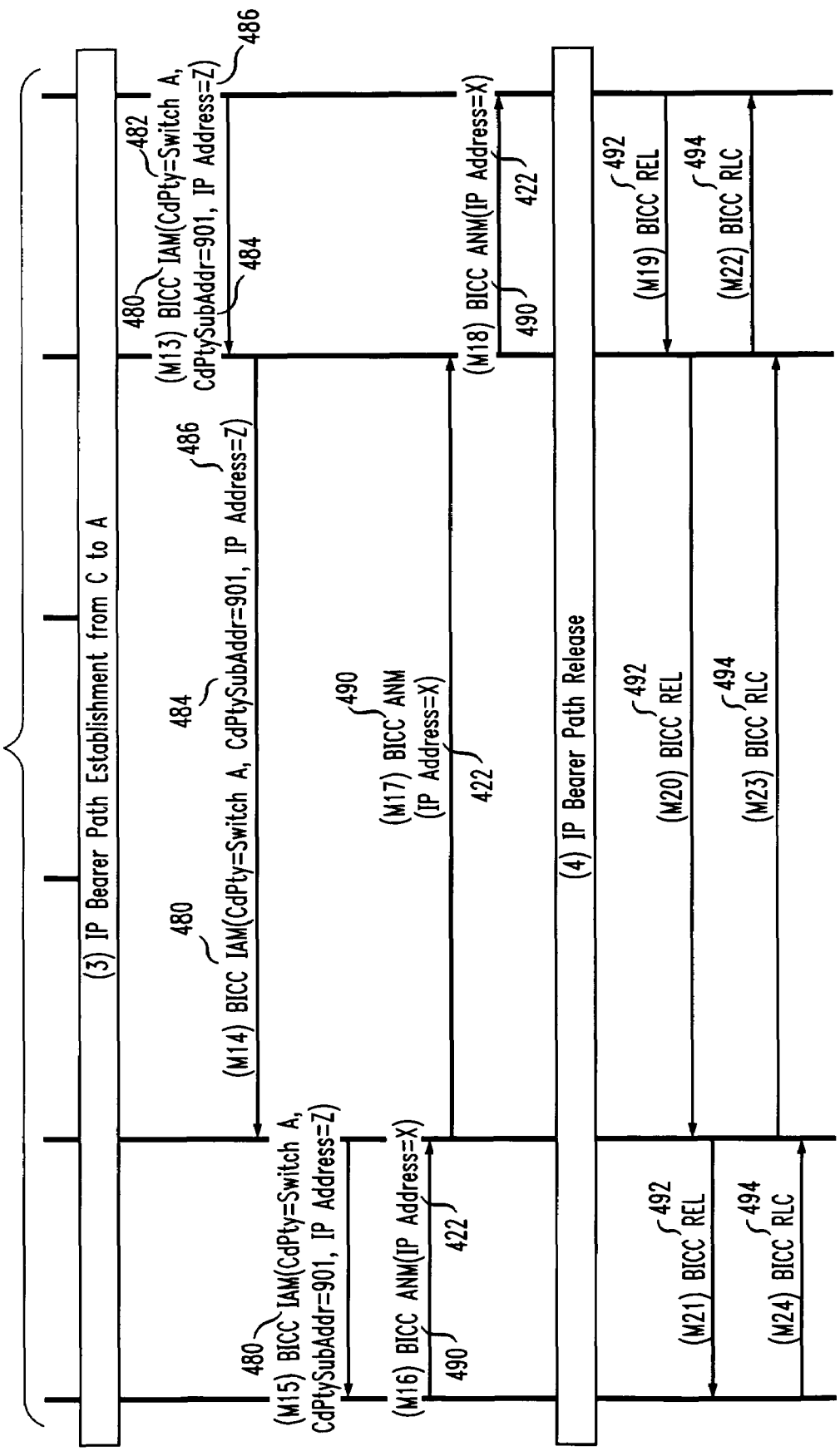

Referring to FIG. 4, where the bearer network is an IP bearer network using Bearer Independent Call Control (BICC), path negotiation 122, 150 takes the form of a switch-to-switch call request made via a BICC IAM message. For example, a local switch 414 transmits a BICC IAM message 418. The BICC IAM message 418 includes a reference to at least one bearer resource that is being dynamically managed or allocated. For instance, the BICC IAM message includes a reference to an IP address 422. The IP address 422 is associated with a dynamically allocatable bearer resource. Additionally, the BICC IAM message 418 includes a reference 426 to a directory number associated with a remote switch 430. The BICC IAM message is a request to establish a switch-to-switch call between the local switch 418 and the remote switch 430. The referenced 426 directory number may indicate to the remote switch that the requested switch-to-switch call is for the purpose of establishing dynamically managed or allocated bearer path. The BICC IAM message 418 also includes a CIC number or called party sub-address 434 used during call processing to refer to the dynamically selected trunk member to be associated with the IP address 422. The BICC IAM message 418 may be relayed to the remote switch 430 by intermediate network elements. For example, the BICC IAM message 418 is relayed by BICC IP switches 438, 442. The remote switch 430 responds with a BICC ANM message 446. The BICC ANM message includes a reference to another dynamically allocated bearer resource. For example, the BICC ANM message 446 includes a reference to a second IP address 450 and acknowledges the establishment of a connection between the first IP address 422 and the second IP address 450.

Figure 5:
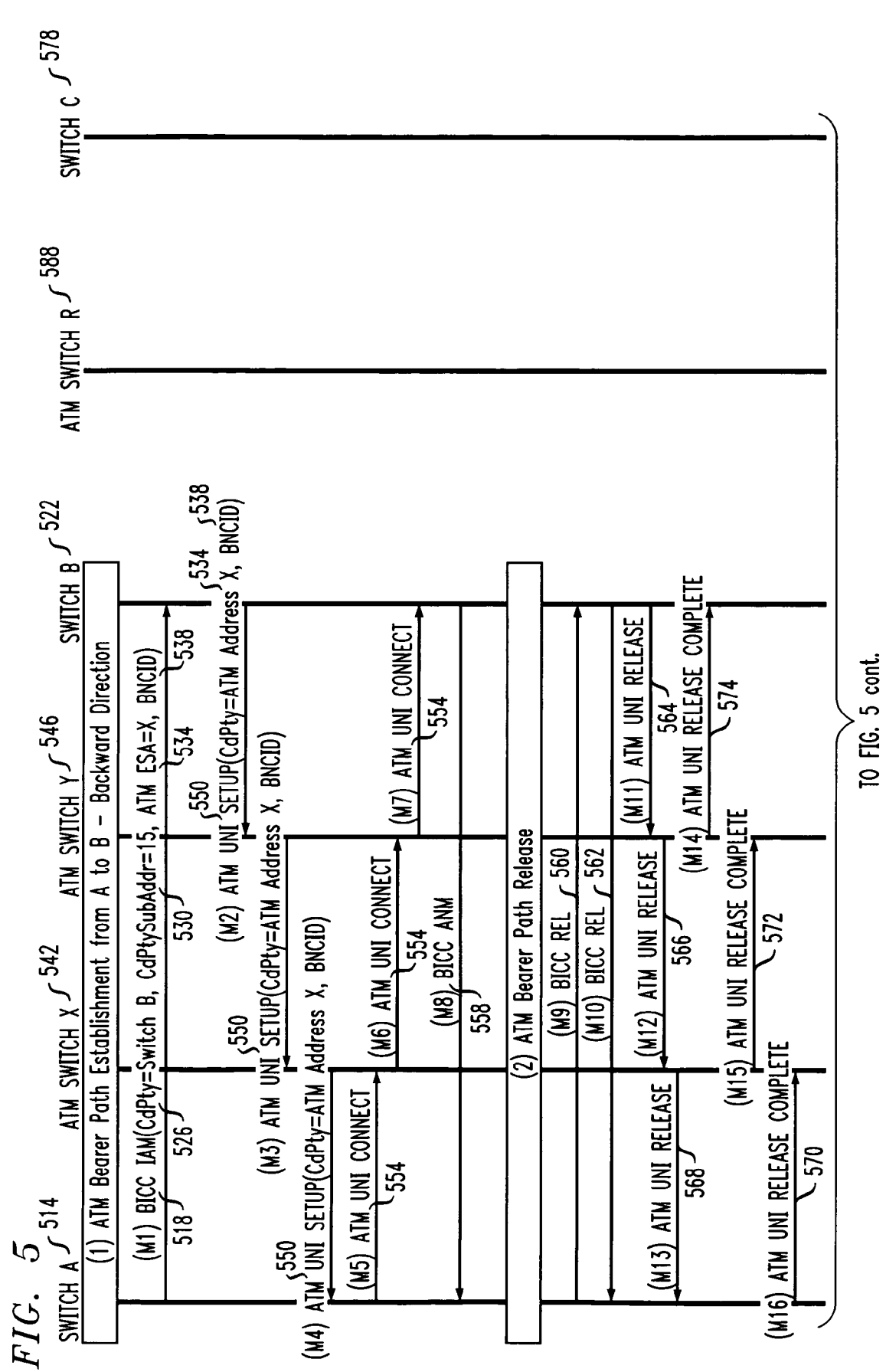
FIG. 5 is a call flow diagram summarizing dynamic bearer path establishment and tear down using BICC in an ATM bearer network.
Figure 5:
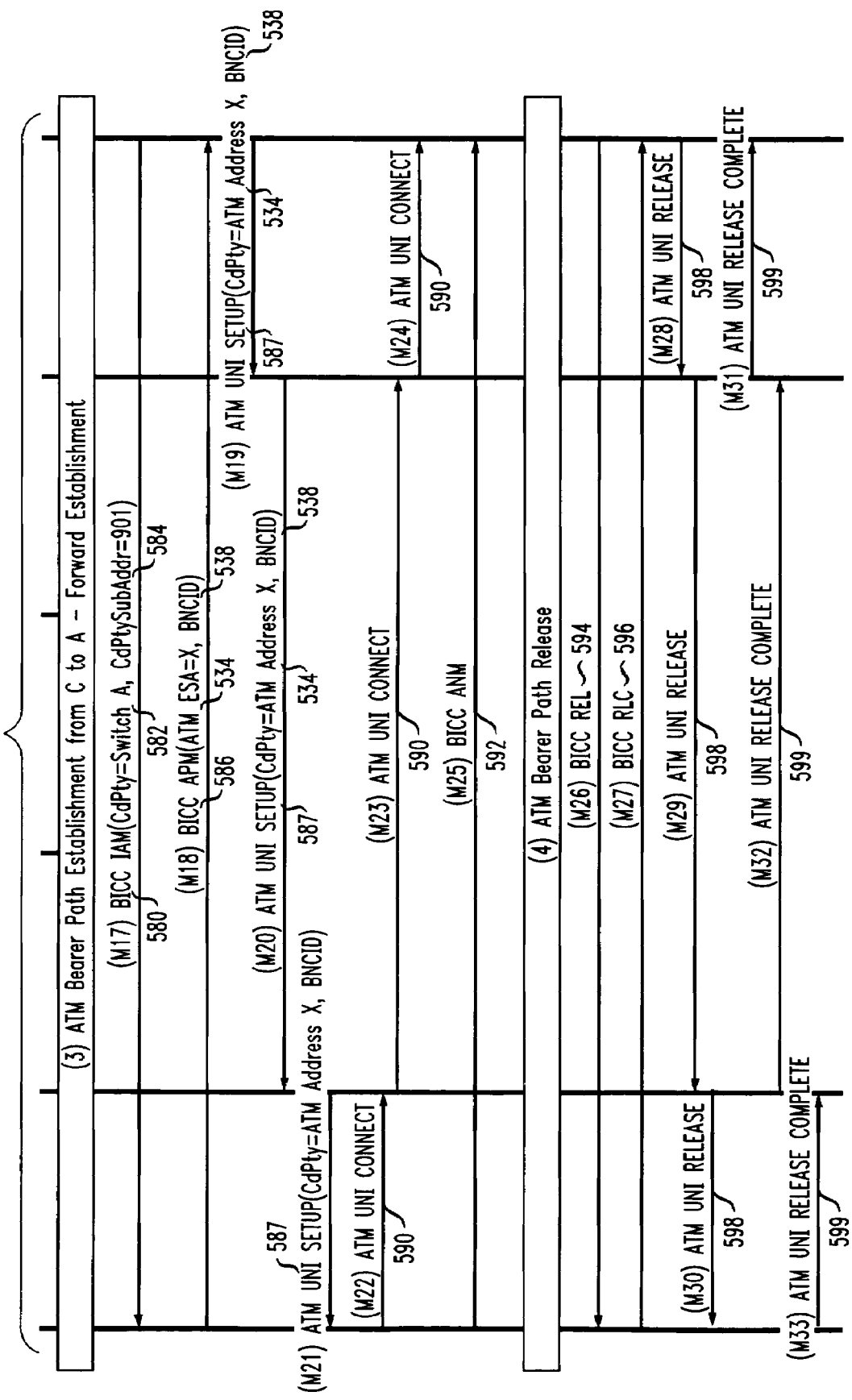

Referring to FIG. 5, where the bearer network is an ATM bearer network using BICC, path negotiation 122, 150 takes the form of a switch-to-switch call request that may be made via a BICC IAM message. For example, a local switch 514 transmits a BICC IAM message to a remote switch 522. The BICC IAM message 518 includes a reference 526 to a directory number associated with the remote switch 522, a CIC number or called party sub-address 530, an ATM address 534 and a BNCID (Backbone Network Connect ID) 538. The reference to the directory number 526 and the CIC or called party sub-address 530 are used for purposes similar to similarly named message elements described above. The ATM address 534 is an alias for a bearer resource being dynamically allocated. The BNCID is used as an identifier for the switch-to-switch call. The remote switch 522 begins the path establishment process by transmitting a message back through the chain of network elements associated with the BICC IAM message 518. For example, the remote switch 522 transmits an ATM UNI (User Network Interface) SETUP message 550 to the second ATM switch 546. The ATM UNI SETUP message 550 includes the BCNID 538 and the ATM address 534. The second ATM switch 546 relays the ATM UNI SETUP message 550 to the first ATM switch 542. The first ATM switch 542 relays the ATM UNI SETUP message 550 to the local switch 514. The local switch acknowledges the ATM UNI SETUP message 550 with an ATM UNI CONNECT message 554 that is transmitted back to the chain to the remote switch 522. The remote switch 522 acknowledges the connect message 554 with a BICC ANM message 558 thereby establishing an ATM bearer path between the local switch 514 and the remote switch 522 using the dynamically allocated resources associated with the ATM address 534.

Referring to FIG. 6, once the bearer path is established, marking 126, 154 the selected trunk member as available for use can include transmitting an ISUP UBL (unblock) message 614. For example, the local switch 214, 314, 414, 514 transmits the ISUP UBL message 614 to the remote switch 218, 322, 430, 522. The ISUP UBL message 614 includes a reference 618 to at least one trunk member being dynamically selected or provisioned. For instance, the reference 618 is a CIC number. The remote switch 218, 322, 430, 522 updates a parameter value in a table or database associated with the reference or CIC number 518. For example, the parameter value is changed from a value of blocked or unavailable to a value of unblocked or available. The remote switch 218, 322, 430, 522 acknowledges the availability of the referenced 618 trunk member by transmitting an ISUP UBA (Unblock Acknowledge) message 622 including the reference 618 to be at least one dynamically selected, managed or provisioned trunk member. Coincident with the transmission of the ISUP UBL message 614 or the reception of the ISUP UBA message 622, the local switch 214, 314, 414, 514 also updates a table or database parameter value, changing it from a blocked or unavailable state to an unblocked or available state.

Once the path is marked as available 126, 154, the path can be used to carry calls in the manner known in the art. For example, the switch 214, 314, 414, 514 transmits a second ISUP IAM message 626. The second ISUP IAM message 626 includes a reference 630 to the at least one truck member that was dynamically selected, managed or provisioned and, therefore, to the entire path that was established during the negotiation 122, 150. The remote switch 218, 322, 430, 522 acknowledges the second ISUP IAM message 626 with a first ISUP ACM (Address Complete) message 634 including the reference 630 to the dynamically selected trunk member and begins to alert the called device. If the call is answered, the remote switch 218, 322, 430, 522 transmits an ISUP ANM message 638 to the local switch 214, 314, 414, 514. The local switch then connects the calling party to the dynamically allocated or provisioned bearer path. When one of the calling or called parties ends the call or hangs up, the related switch sends and ISUP REL (Release) message. For example, if the calling party of the exemplary call scenario hangs up, the local switch 214, 314, 414, 514 transmits an ISUP REL message 642 including the reference 630 to the dynamically managed or provisioned trunk member. Since only one call is carried on the path at any one time, the reference 630 to the trunk member is also a reference to the call. In response, the remote switch 218, 232, 430, 522 transmits an ISUP RLC (Release Complete) message 644 back to the local switch 214, 314, 414, 514 thereby freeing the trunk member for use in carrying another call.

For example, a remote user can call a user local to the local switch 214, 314, 414, 514. In processing such a call, the remote switch 218, 322, 430, 522 may transmit a third ISUP IAM message 646 including a reference 630 to the dynamically managed or provisioned trunk member. In that case, the local switch 214, 314, 414, 514 responds with an ISUP ACM message 648 and, if the called party should answer, transmits an ISUP ANM message 650. If the called party hangs up, the local switch 214, 314, 414, 514 transmits an ISUP REL message 652 including the reference 630 to the dynamically selected trunk member and, therefore, to the call. The remote switch 218, 322, 430, 522 responds with an ISUP RLC message 654, and the dynamically selected trunk member is once again available to bear another call.

The dynamically selected trunk member can be used for any purpose that a similar static or manually provisioned resource can be used for. For example, a voice path assurance test can be run on a bearer path associated to the dynamically selected trunk member. For instance, the local switch 214, 314, 414, 514 may transmit a third ISUP IAM message 658 including the reference 630 to the dynamically selected trunk member as well as a VPA parameter informing the remote switch 218, 322, 430, 522 that the local switch 214, 314, 414, 514 is going to run a voice path assurance test. In response, the remote switch 218, 322, 430, 522 provides a loop-back path. When the voice path assurance test is finished, the local switch 214, 314, 414, 514 transmits an ISUP COT (Continuity Test) message 662 indicating, for example, that the voice path assurance test was passed. In that case, the call initiated with the third ISUP IAM message 658 is processed 664 in a manner similar to the call processing described above.

If a determination is made 130, 158, the traffic between the local switch 214, 314, 414, 514 and the remote switch 218, 322, 430, 522 no longer justifies the allocation of the dynamically provisioned trunk member, the path associated with the dynamically selected trunk member is marked as unavailable 134, 162. For example, if the local switch 214, 314, 414, 514 makes the determination that traffic between the local switch 214, 314, 414, 514 and remote switch 218, 322, 430, 522 is too light to justify the allocation of the dynamically selected trunk member, the local switch 214, 314, 414, 514 transmits an ISUP BLO (Block) message 668 to the remote switch 218, 322, 430, 522. As a result, the remote switch 218, 322, 422 updates a table or database parameter value associated with the dynamically selected trunk member to a value of blocked or unavailable and transmits an ISUP BLA (Block Acknowledged) message 670 back to the local switch 214, 314, 414, 514, and the switches begin the process of tearing down 138, 166 the dynamically allocated bearer path or switch-to-switch call.

For example, referring to FIG. 2, the local switch 214 sends and ISUP REL message 266 referencing the second CIC number 238 to the first intermediate network element 226 releasing the bearer resource associated with the second CIC number 238. The first intermediate network element 226 transmits an ISUP REL message 268 to the second intermediate network element 242 including a reference to the third CIC number 246, thereby releasing the bearer resource associated with the third CIC number 246. In turn, the second intermediate network element 242 transmits an ISUP REL message 270 releasing the bearer network resource associated with the fourth CIC number 250 that interconnects the second intermediate network element 242 with the remote switch 218. As explained above, the fourth CIC number 250 is associated by the remote switch to a trunk member labeled by the first CIC number 230. Therefore, the ISUP REL messages 266, 268, 270 release the network resources used in the dynamically allocated bearer path for reuse. The recipient 266, 242, 218 of each ISUP REL message 266, 268, 270 confirms the release of the associated bearer network resources with an ISUP RLC message 272, 274, 276.

Once the dynamically allocated or provisioned bearer resources are released back to the common pool of resources, they can be reused to establish other bearer paths. For example, a second remote switch 278 may make a determination 118 that traffic between the second remote switch 278 and the local switch 214 justifies the allocation of additional resources. Therefore, the second remote switch 278 transmits a second ISUP IAM message 280 including a reference 282 to a directory number associated with the local switch 214, a CIC number or called party sub-address 284 for use as a label identifying the dynamically selected trunk member for purposes of call processing and a fifth CIC number 286 identifying one or more resources to be used in establishing part of the bearer path between the second remote switch 278 and a third intermediate network element 288. The third intermediate network element 288 retransmits the second ISUP IAM message 280 to, for example, the first intermediate network element 226. However, the fifth CIC number 286 is replaced with a sixth CIC number 290. The sixth CIC number 290 identifies one or more bearer resource that can be used to establish a link between the third intermediate network element 288 and the first intermediate network element 226. The first intermediate network element 226 retransmits the second ISUP IAM message 280 and replaces the sixth CIC number 290 with the second CIC number 238. The reference to the second CIC number is a direction to reuse the one or more resources identified by the second CIC number to establish the bearer path between the local switch 214 and the second remote switch 278.

As explained above, in prior art systems and methods, the resources associated with the second CIC number 238 would be dedicated to a path between the local switch 214 and the first remote switch 218, on a permanent or semi-permanent basis. Therefore, in prior art systems, the resources associated with the second CIC number cannot be automatically or dynamically reallocated. Prior art systems require craft or service personnel to manually reallocate such a resource to a different path.

In a manner similar to that described above, the switch-to-switch call request represented by the second ISUP IAM message 280 is acknowledged and accommodated by the transmission of a series of ISUP ANM messages 291, 292, 293, and the dynamically allocated or provisioned bearer path is established between the local switch 214 and the second remote switch 278. Once the bearer path is dynamically established between the second remote switch 278 and the local switch 214, it can be used to bear call traffic between the local switch 214 and the second remote switch 278. For example, see FIG. 7 which illustrates the setup and tear down of calls between the local switch and second remote switch in a manner similar to the setup and tear down of calls illustrated in FIG. 6.

If a determination 130, 158 is made that traffic between the local switch 214 and the second remote switch 278 no longer justifies the allocation of the dynamically provisioned resources to a bearer path therebetween, the connection is torn down 138, 166. For example, a series of ISUP REL messages 294, 295, 296 and ISUP RLC messages 297, 298, 299 are transmitted thereby releasing the bearer network resources for use in establishing yet another bearer path.

Referring to FIG. 3, in an IP bearer network using SIP, the dynamically allocated trunk group number bearer path is torn down through the transmission of SIP BYE messages 352. The SIP BYE messages are responded to with SIP 200 OK (BYE) messages 356 which confirm the release of associated bearer network resources.

Once the dynamically established bearer path is torn down, the dynamically allocated resources that made up the bearer path can be reused to establish other bearer paths.

For example, a second remote switch 378 may make a determination 118, 146 that traffic volume between the second remote switch 378 and local switch 314 justifies the allocation of additional bearer resources between the two switches 378, 314. Therefore, in a manner similar to that described in reference to the first SIP INVITE message 318, the second remote switch 378 transmits a second SIP INVITE message 380. The second SIP INVITE message 380 includes an address 382 referencing the local switch, an address 384 associated with the second remote switch 378 and a third IP address 386 identifying a resource to be used in establishing the requested switch-to-switch call or bearer path. One or both of the address 382, 384 referencing the local or second remote switch 314, 378 may indicate to the local switch 314 that the requested switch-to-switch call is for the purpose of establishing a dynamically allocated bearer path. The second remote switch 378 transmits the second SIP INVITE message 380 to a third intermediate network element 388 which relays the SIP INVITE message 380 including all the parameters 382, 384, 386 to, for example, the first intermediate network element 326. The first intermediate network element 326 relays the second SIP INVITE message 380 to the local switch 314. The local switch 314 responds with a second SIP 200 OK message 390. The second SIP 200 OK message 390 includes a reference to the first IP address 332. The first IP address 332 is associated with a resource that can be reused to establish the requested bearer path between the local switch 314 and a second remote switch 378. The SIP 200 OK message 390 is relayed to the second remote switch 278 by the first intermediate network element 326 and the third intermediate network element 388 thereby dynamically establishing a bearer path between the local switch 314 and the second remote switch 378 using a dynamically allocated or reallocated bearer resource 332.

Figure 7:
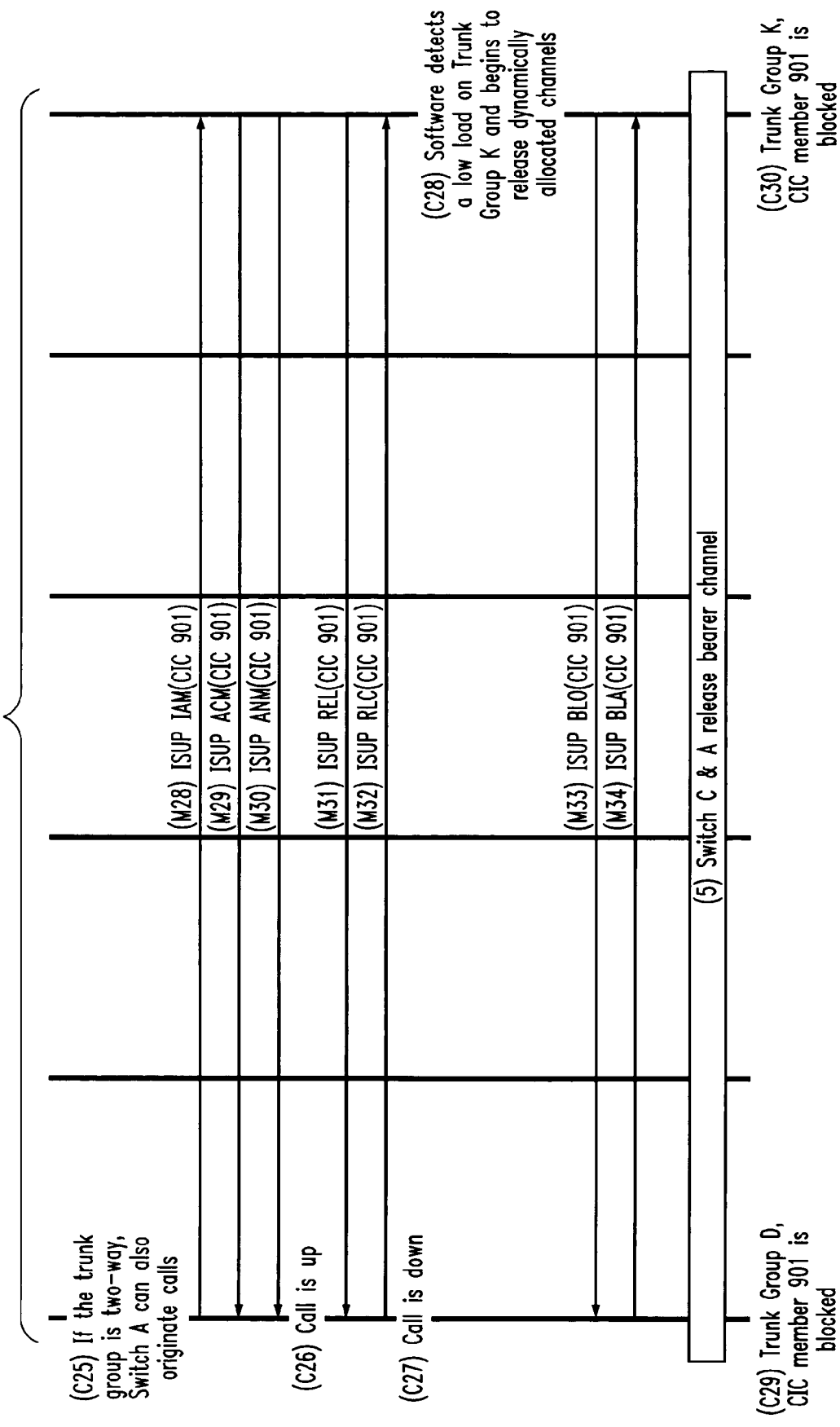
FIG. 7 is a call flow diagram outlining call placement over a dynamically established path between a local switch and a second remote switch.

Once the dynamically allocated bearer path is established, it can be associated to a dynamically selected trunk member and that trunk member used to bear call traffic as illustrated in FIG. 7.

If a determination 130, 158 is made that the dynamically provisioned trunk is no longer required, the bearer path is torn down 146, 162 through the transmission of SIP BYE messages 392 and SIP 200 OK acknowledgements 394.

Referring to FIG. 4, in an IP bearer network using BICC, the dynamically allocated bearer path is torn down through the transmission of BICC REL messages 454 which are acknowledged with BICC RLC messages 456 and which release dynamically allocatable bearer resources back to the pool of such reallocatable elements.

For example, a second remote switch 478 may make a determination 118, 146 that additional resources are needed to bear traffic between the second remote switch 478 and the local switch 414. The second remote switch 478 transmits a BICC IAM message 480 as a first step in establishing a switch-to-switch call between the second remote switch 478 and the local switch 414. The BICC IAM message includes a reference to a directory number associated with the local switch 414, a CIC number or called party sub-address 484 and an IP address 486. The reference 482 to a directory number associated with the local switch can identify the reason for the requested call as described above. The CIC number or called party sub-address 484 can be used as a label or reference to the selected trunk member associated with the path once it is dynamically established. The third IP address 486 identifies or is associated with a bearer resource to be used in establishing the switch-to-switch call or bearer path. The second BICC IAM message 480 is transmitted, for example, to a third intermediate network element 488. The third intermediate network element 488 relays the second BICC IAM message 480 to, for example, the first intermediate network element 438 which relays the second BICC IAM message 480 to the local switch 414. The local switch 414 responds with a BICC ANM message 490. The BICC ANM message includes a reference to the first IP address 422. The reference to the first IP address 422 is an indication that the bearer resource associated with the first IP address 422 should be reused in establishing the bearer path requested by the second BICC IAM message 480. The second BICC ANM message 490 is transmitted to the first intermediate network element 438 which relays the second BICC ANM message to the third intermediate network element 488. The third intermediate network element 488 relays the second BICC ANM message 490 to the second remote switch 478 thereby dynamically establishing the requested bearer path with a dynamically reallocated bearer resource.

Once the requested bearer path is dynamically established and associated with a selected trunk member, the trunk member may be used to carry traffic as illustrated in FIG. 7.

If a determination 130, 158 is made that use of the dynamically allocated bearer resource and path is no longer justified, the path is torn down 138, 166. For example, the second remote switch 478 transmits a BICC REL message 492 which is relayed to the local switch 414. In response to the second BICC REL message 492, second BICC RLC messages 494 are transmitted confirming the release of the bearer path resources back to the common pool where they can be selected for reuse in establishing yet other bearer paths.

Referring to FIG. 5, in an ATM bearer network using BICC when a determination 130, 158 is made that the dynamically allocated bearer path is no longer justified, a BICC REL message 560 is transmitted, for example, from the local switch 514 to the first remote switch 522. The first remote switch 522 responds with a BICC RLC message 562 which is transmitted directly to the local switch 514. Additionally, the first remote switch 522 transmits an ATM UNI RELEASE message 564 to the second intermediate network element 546. In turn, the second intermediate network element 546 transmits an ATM UNI RELEASE message 566 to the first intermediate network element 542. The first intermediate network element transmits and ATM UNI RELEASE message 568 to the first local switch 514. The ATM UNI RELEASE messages 564, 566, 568 are responded to with ATM UNI RELEASE COMPLETE messages 570, 572, 574 which confirm the release of bearer path resources to the common pool of resources.

For example, a second remote switch 578 determines 118, 146 that additional bearer resources are required to carry traffic between the second remote switch 578 and the local switch 514 and transmits a second BICC IAM message 580 to the local switch 514. The second BICC IAM message 580 includes a reference 582 to a directory number associated with the local switch 514 and a CIC number or called party sub-address 584. As described above in reference to other bearer networks and protocols, the reference 582 to a directory number can be used to indicate the purpose of the switch-to-switch call requested by the second BICC IAM message 580. The CIC number or called party sub-address 584 can be used as a reference to the trunk member to be used during subsequent call processing. The local switch 514 responds to the second BICC IAM message 580 with a BICC APM (Application Transport Mechanism) message 586. The BICC APM message 586 includes, for example, a reference to the ATM address 534 and BNCID 538. The reference to the ATM address 534 is a direction that the bearer resource associated therewith be reused in the establishment of the requested bearer path or switch-to-switch call between the second remote switch 578 and the local switch 514.

Upon receipt of the BICC APM message 586, the second remote switch 578 transmits an ATM UNI SETUP message 587 to a third intermediate network element 588. The third intermediate network element 588 transmits the ATM UNI SETUP message 587 to, for example, the first intermediate network element 542. The first intermediate network element 542 transmits the ATM UNI SETUP message 587 to the local switch 514. The local switch 514 replies with an ATM UNI CONNECT message 590 to the first intermediate network element 554 which in turn transmits the ATM UNI CONNECT message 590 to the third intermediate network element 588. The third intermediate network element 588 transmits the ATM UNI CONNECT message to the third remote switch 578. Additionally, the local switch 514 transmits a BICC ANM message 592 to the third remote switch 578 and the requested switch-to-switch call or dynamically allocated bearer path is established.

Once the requested bearer path is dynamically established, it can be associated with a selected trunk member and that trunk member used to carry traffic as illustrated in FIG. 7.

If a determination 146, 158 is made that the dynamically allocated path is no longer required, a BICC REL message 594 is transmitted, for example, from the second remote switch 578 to the local switch 514. The local switch 514 responds with a BICC RLC message 596. As a result, the second remote switch 578 transmits an ATM UNI RELEASE message 598 to the third intermediate network element 588 which retransmits it the ATM UNI RELEASE message 598 to the first intermediate network element 542. The first intermediate network element 542 retransmits the ATM UNI release message 598 to the local switch 514. Each network element 588, 542, 514 responds to the ATM UNI release message 598 with an ATM UNI RELEASE COMPLETE message 599. Thereby releasing any dynamically allocated bearer resources back to the common pool where they can be selected for use in establishing yet other bearer paths.

Figure 8:
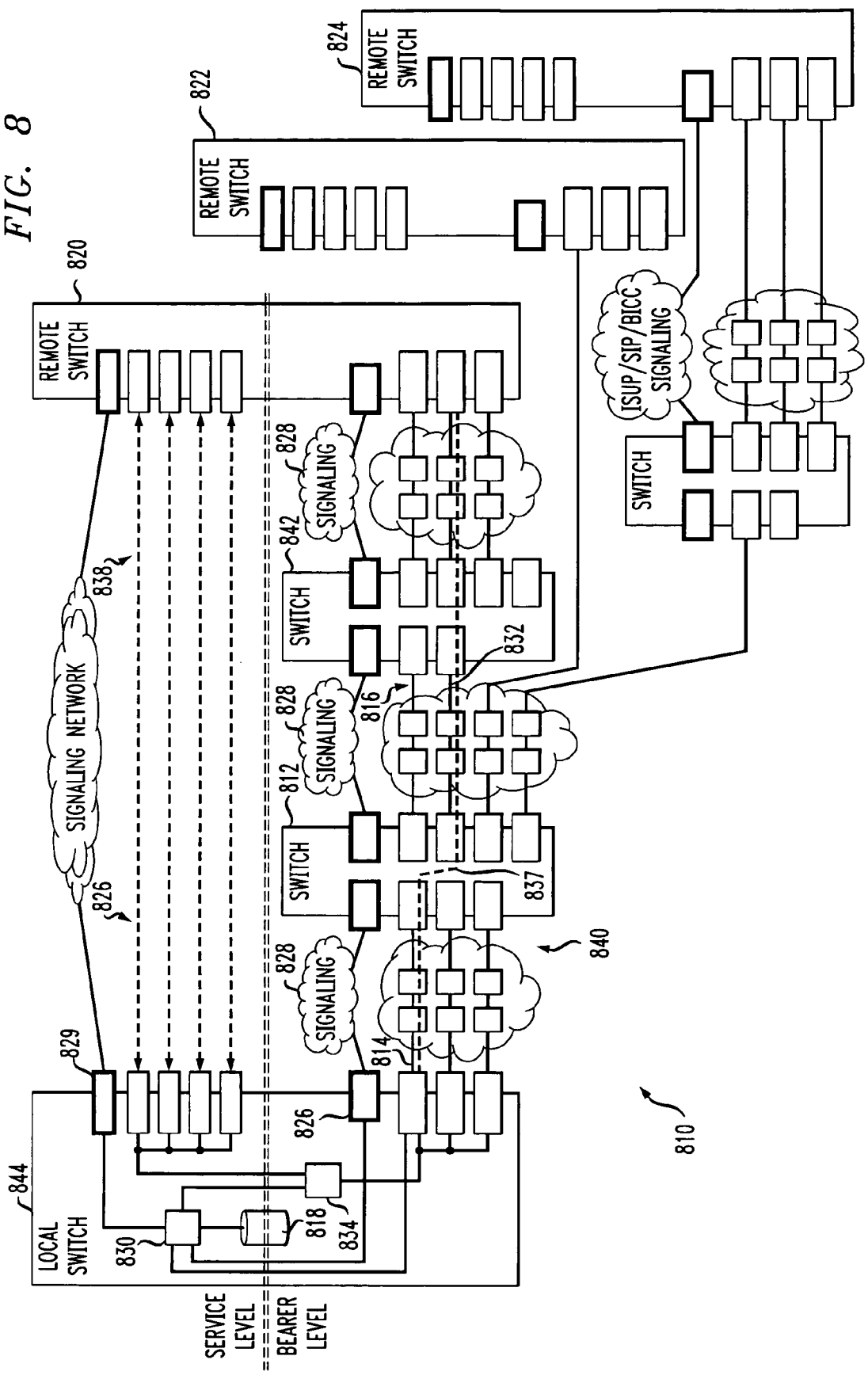
FIG. 8 is a block diagram of a system operative to perform the method of FIG. 1.

Referring to FIG. 8, an exemplary embodiment of a system 810 for dynamically managing, allocating or provisioning trunk members includes a network element 812 connected to at least one dynamically allocatable bearer resource 814 and a plurality 816 of additional bearer resources. Additionally, the system 810 includes a database 818. The database associates each of the bearer members of the plurality 814 of bearer resources with at least one network element 812. The database 818 also associates the network element 812 with at least one bearer resource label (e.g., CIC number 238, IP Address 332, 422, ATM Address 534). The database 818 also associates each of the trunk members of the plurality 836 with at least one remote switch 820, 822, 824. The database 818 also associates with each of the trunk members a trunk member label (e.g., CIC number 230) and a status parameter associated with the trunk label. When a dynamic bearer path (e.g. 837) has been established, the database 818 also stores the association between the trunk member label (e.g. CIC number 230) and the dynamically allocated bearer path (e.g. 837).

A bearer level communications element 826 transmits and receives signaling messages to and from a signaling network. For example, the signaling messages can include ISUP IAM messages (e.g., 222, 280), ISUP ANM messages (e.g., 262, 291), ISUP REL messages (e.g., 266, 296), ISUP RLC messages (e.g., 272, 297), SIP INVITE messages (e.g., 318, 380), SIP 200 OK messages (e.g., 344, 390), SIP ACK messages (e.g., 348), SIP BYE messages (e.g., 352, 390), SIP 200 OK messages (e.g., 356, 394), BICC IAM messages e.g., 418, 480, 518, 580), BICC ANM messages (e.g., 446, 490), BICC REL messages (e.g., 454, 492), BICC RLC messages (e.g., 456, 494), ATM UNI SETUP messages (e.g., 550, 587), ATM UNI CONNECT messages (e.g., 545, 587), ATM UNI CONNECT messages (e.g., 554, 590), BICC APM messages (e.g., 586), BICC ANM messages (e.g., 558, 592), ATM UNI RELEASE messages (e.g., 568, 598), and ATM UNI RELEASE complete messages (e.g., 570, 599.

The bearer level communications element 826 of the illustrated exemplary system 810 communicates over a signaling network 828. In some systems, the communications element communicates over another path. For example, in some SIP/IP networks, signaling communication can be carried out over an ordinary bearer path.

A call level communications element 829 transmits and receives call level signaling messages to and from one or more remote switches (e.g., 820). For example, the call level signaling messages can include ISUP UBL 614, UBA 622, IAM 626, ACM 634, ANM 638, REL 642, RLC 664, COT 662, BLO 668 and BLA 670 messages.

The system 810 also includes an information processor 830. The information processor 830 is connected to the database 818, the bearer layer communications element 826 and the call level communications element 829. The information processor 830 is connected to the switching element 812 through the bearer layer communications element 826 and the intervening signaling network 828 and/or a bearer path (not shown). The information processor sends and/or receives at least one message to and/or from the remote switch 820 through services of the bearer level communications element 826. The messages are associated with the dynamically allocatable bearer resource 814 and are related to the control of the switching element to connect or disconnect the bear resource (e.g., 814) to one of the additional bear resources 816 (e.g., 832). The information processor 830 can use the services of the call level communications element 829 to transmit and receive messages related to the status of trunk members (e.g., 836) associated with such connections. For example, the information processor can use the services of the call level communications element to send and receive ISUP BLO 668, BLA 670, UBL 614 and UBA 662 messages.

The system 810 may also include a traffic monitor 834. The traffic monitor is operative to monitor traffic volume or load on a plurality of trunk resources 836. The trunk members can be static or permanent or semi-permanently allocated members 838 and/or dynamically associated with allocatable resources 840. Where the system 810 includes a traffic monitor 834, the information processor 830 is connected to the traffic monitor 834 and receives a traffic report from the traffic monitor 834. The information processor determines 118, 146 if traffic volume or load on one or more of the plurality 836 of trunk resources is above a threshold. If the traffic load is above the threshold, the information processor may select a trunk member and associate it with a dynamically allocatable bearer resource (e.g., 814) to share the load of the over burdened or nearly over burdened trunk resource. For example, the information processor sends a message to a remote switch (e.g., 820) associated with the over burdened or nearly over burdened trunk resources. The message (e.g., 222, 318, 418, 518) includes a trunk resource label associated (i.e., in the database 818) with the remote switch. The message directs the remote switch and any network elements (e.g., 812, 842) associated with a dynamically allocatable bearer path between a local switch 844 and the remote switch 820 to establish that bearer path through the dynamically allocatable bearer resource (e.g., 814), the switching element 812 and at least one of the additional trunk resources 816 (e.g., 832). Additionally, a status parameter of the trunk resource 836 is updated to a value of active or unblocked (614).

Alternatively, the system 810 does not include the traffic monitor 834. Instead, a traffic monitor exists outside the system. For example, the traffic monitor is included in a remote switch. In that case, the information processor is operative to receive a message from the remote switch through the services of the call level communications element 829. The message includes a name or label (e.g., CIC number 230) and directs the information processor 830 to change the status parameter associated with the trunk member to a value of active or unblocked. Alternatively or additionally, a message is received through the service of the bearer level communication element 826 that directs the switching element 812 to associate the bearer resource labeled with the bearer name (e.g., CIC number 238, IP Address 332, 422, ATM Address 534) or label to a trunk member between the local switch 844 and the remote switch 820.

If the system 810 includes the traffic monitor 834, the information processor 830 monitor reports from the traffic monitor 834 and may determine 130, 158 that the traffic load or volume between the local switch 844 and the remote switch 820 is below a threshold. In that case, the information processor 830 selects a dynamically selected trunk member to be removed from the plurality of trunk members between the local switch and the remote switch. The information processor 830 sends a message to the remote switch 820. The message includes the trunk member label (e.g., CIC number 230) associated with the remote switch and directing the remote switch to change the status parameter associated with the trunk member label to an inactive or blocked state. Additionally, the information processor 830 sends a message that directs the switching element 812 and any additional network elements 842 associated with the bearer path between the local switch and the remote switch to disconnect the dynamically allocatable bearer resource 814 and the at least one additional resource (e.g., 832) from the bearer path between the local switch and the remote switch. Additionally, the information processor updates its own records with regard to the trunk member or trunk member label to a value of inactive or blocked.

Of course, if the traffic monitor is outside the system, then the information processor 830 of the system 810 may receive a message (e.g., from the remote switch) directing the information processor to tear down one or more elements of the dynamically allocatable bearer path between the local switch 844 and the remote switch 820.

It is understood that the functions of the system 110 can be implemented in other functional blocks and distributed in other network components as various combinations of hardware and software. In this regard, system 110 is simply exemplary.

The invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

The invention claimed is:

1. A method for real time trunk member allocation, the method comprising:
   monitoring traffic volume between a local switch and a first remote switch;
   determining, by a network component, that traffic volume between the local switch and the first remote switch justifies allocating additional trunk resources between the local switch and the first remote switch;
   dynamically selecting a first trunk member between the local switch and the first remote switch that is marked as unavailable;
   dynamically negotiating a first bearer path between the local switch and the first remote switch through a first set of bearer resources including a dynamically allocatable bearer resource in response to the determined justification;
   associating the negotiated first bearer path to the first selected trunk member; and,
   marking the selected first trunk member as available for use.

2. The method for real time trunk member allocation of claim 1 further comprising:
   determining that the traffic volume between the local switch and the first remote switch no longer justifies allocating the additional trunk resources between the local switch and the first remote switch;
   marking the first selected trunk member as unavailable for use; and,
   dynamically tearing down the first bearer path associated with the first selected trunk member, thereby freeing the dynamically allocatable bearer resource for dynamic reallocation.

3. The method for real time trunk member allocation of claim 2 further comprising:
   monitoring traffic volume between the local switch and a second remote switch;
   determining that the traffic volume between the local switch and the second remote switch justifies allocating additional trunk resources between the local switch and the second remote switch;
   dynamically selecting a second trunk member between the local switch and the second remote switch;

dynamically negotiating a second bearer path between the local switch and the second remote switch through a second set of bearer resources including the dynamically allocatable resource;

associating the negotiated second path to the second selected trunk member; and, marking the selected second trunk member as available for use.

4. The method for real time trunk member allocation of claim 3 further comprising:

determining that the traffic volume between the local switch and the second remote switch no longer justifies allocating the additional trunk resources between the local switch and the second remote switch;

marking the negotiated second trunk member as unavailable for use; and, dynamically tearing down the associated second bearer path, thereby freeing the trunk resource for dynamic reallocation.

5. The method for real time bearer resource allocation of claim 1 wherein dynamically negotiating a first bearer path comprises:

transmitting a message requesting the establishment of a switch-to-switch call through the dynamically allocatable bearer resource.

6. The method for real time bearer resource allocation of claim 5 wherein transmitting a message requesting the establishment of a switch-to-switch call comprises:

transmitting a first ISUP IAM message including a directory number associated with the remote switch.

7. The method for real time bearer resource allocation of claim 5 wherein transmitting a message requesting the establishment of a switch-to-switch call comprises:

transmitting a first ISUP IAM message including a directory number associated with the remote switch and associated with a real time trunk allocation function.

8. The method for real time bearer resource allocation of claim 5 wherein transmitting a message requesting the establishment of a switch-to-switch call comprises:

transmitting a SIP INVITE message including an address designating the remote switch.

9. The method for real time bearer resource allocation of claim 5 wherein transmitting a message requesting the establishment of a switch-to-switch call comprises transmitting a BICC IAM message including an address designating the remote switch.

10. The method for real time bearer resource allocation of claim 9 wherein transmitting a message requesting the establishment of a switch-to-switch call comprises transmitting an ATM UNI SETUP message.

11. The method for real time trunk member allocation of claim 1 wherein marking the negotiated first member as available for use comprises:

transmitting an ISUP UBL message.

12. A system operative to dynamically manage a trunk member, the apparatus comprising:

a bearer layer signaling network;

a switching element connected to a bearer resource and a plurality of additional bearer resources and the bearer layer signaling network;

a database associating at least the trunk member with at least one remote switch, the database also associating the switching element with a trunk member label identifying the trunk member and a status parameter;

a bearer layer communications element operative to transmit and receive signaling messages to and from a bearer layer signaling network, the signaling messages communicating information related to a switch state of the switching element;

a call layer communications element operative to transmit and receive signaling messages to and from a remote switch, the signaling messages communicating information related to values of the status parameter;

a traffic monitor operative to monitor a traffic load on a plurality of trunk members; and, an information processor connected to the database, the bearer layer communications element and the call layer communications element, the information processor being operative to send and/or receive a message to and/or from theremote switch through services of the bearer layer or call layer communications element, the message being associated with the trunk member label, and control the switching element through services of the bearer layer communications element to associate or disassociate the trunk member to or from one of the additional bearer resources, wherein the information processor is further connected to the traffic monitor, the information processor being operative to receive a traffic report from the traffic monitor and determine if a traffic load on one or more trunk resources is above a threshold and, if the traffic load is above the threshold, select a trunk member to use; select the bearer resource to share the traffic load of the one or more trunk resources, send one or more messages to a remote switch associated with the one or more trunk resources and to network elements associated with a bearer path between the local switch and the remote switch, the one or more messages including a trunk member label associated with the remote switch, the one or more messages directing the remote switch and the network elements to establish the bearer path through the bearer resource, the switching element and at least one of the additional bearer resources, and/or directing the remote switch to update a status parameter of the trunk member to a value of active or unblocked.

13. The system of claim 12 wherein the information processor is further operative to receive the traffic report from the traffic monitor and determine if the traffic load on the plurality of resources is below a second threshold and if the traffic load is below the second threshold, selecting the trunk member to be removed from the plurality of trunk members, send one or more messages to the remote switch and any network elements associated with the path between the local switch and the remote switch, the one or more messages including the trunk member label associated with the remote switch and/or directing the remote switch to change the status parameter associated with the trunk member associated with the remote switch to an in-active or blocked state, and directing the switching element and the network elements associated with the bearer path to disconnect the bearer resource and the at least one additional bearer resource from the path.

14. The system of claim 12 wherein the information processor is further operative to receive a message from a remote switch of the at least one remote switches through the services of the call layer communications element, the message including a label associated with the trunk member and directing the information processor to change the status parameter associated with the trunk resource to a value of active or unblocked.

15. The system of claim 14 wherein the information processor is further operative to receive a message from the remote switch of the at least one remote switches through the services of the call layer communications element, the message including a label of the trunk member and directing the information processor to change the status parameter associated with the trunk member to a value of in-active or blocked.

16. The system of claim 12 wherein the information processor is operative to send and/or receive a ISUP IAM or REL message to and/or from a remote switch through services of the bearer layer communications element, the message being associated with the bearer resource, and control the switching element to connect or disconnect the bearer resource to one of the additional bearer resources as at least part of a path to the remote switch.

17. The system of claim 12 wherein the information processor is operative to send and/or receive a SIP INVITE or BYE message to and/or from a remote switch through services of the bearer layer communications element, the message being associated with the bearer resource, and control the switching element to connect or disconnect the bearer resource to one of the additional bearer resources as at least part of a path to the remote switch.

18. The system of claim 12 wherein the information processor is operative to send and/or receive a BICC IAM or REL message to and/or from a remote switch through services of the bearer layer communications element, the message being associated with the bearer resource, and control the switching element to connect or disconnect the bearer resource to one of the additional bearer resources as at least part of a path to the remote switch.

19. The system of claim 18 wherein the information processor is operative to send and/or receive a ATM UNI SETUP message to and/or from a remote switch through services of the bearer layer communications element, the message being associated with the bearer resource.

20. A system for real time trunk member allocation, the system comprising:
   means for monitoring traffic volume between a local switch and a first remote switch;
   means for determining that traffic volume between the local switch and the first remote switch justifies allocating additional trunk resources between the local switch and the first remote switch;
   means for selecting a first trunk member between the first local switch and the first remote switch that is marked as unavailable;
   means for dynamically negotiating a first bearer path between the first local switch and the first remote switch through a first set of bearer resources including a dynamically allocatable bearer resource in response to the determined justification;
   means for associating the first selected trunk member to the negotiated first bearer path; and,
   means for marking the selected first trunk member as available for use.

21. The system for real time trunk member allocation of claim 20 further comprising:
   means for determining that the traffic volume between the local switch and the first remote switch no longer justifies allocating the additional trunk resources between the local switch and the first remote switch;
   means for marking the negotiated first trunk member as unavailable for use; and,
   means for dynamically tearing down the first bearer path, thereby freeing the dynamically allocatable bearer resource for dynamic reallocation.

22. The system for real time trunk member allocation of claim 21 further comprising:
   means for monitoring traffic volume between the local switch and a second remote switch;
   means for determining that the traffic volume between the local switch and the second remote switch justifies allocating additional trunk resources between the local switch and the second remote switch;
   means for selecting a second trunk member between the local switch and the second remote switch;
   means for dynamically negotiating a second bearer path between the local switch and the second remote switch through a second set of bearer resources including the dynamically allocatable resource;
   means for associating the second selected trunk member to the negotiated second bearer path; and,
   means for marking the selected second trunk member as available for use.

23. The system for real time trunk member allocation of claim 22 further comprising:
   means for determining that the traffic volume between the local switch and the second remote switch no longer justifies allocating the additional trunk resources between the local switch and the second remote switch;
   means for marking the negotiated second trunk member as unavailable for use; and,
   means for dynamically tearing down the second bearer path, thereby freeing the dynamically allocatable bearer resource for dynamic reallocation.

24. The system for real time trunk member allocation of claim 20 wherein the means for dynamically negotiating a first bearer path comprises:
   means for transmitting a message requesting the establishment of a switch-to-switch call through the dynamically allocatable bearer resource.

25. The system for real time trunk member allocation of claim 24 wherein the means for transmitting a message requesting the establishment of a switch-to-switch call comprises:
   means for transmitting a first ISUP IAM message including a directory number associated with the remote switch.

26. The system for real time trunk member allocation of claim 24 wherein the means for transmitting a message requesting the establishment of a switch-to-switch call comprises:
   means for transmitting a first ISUP IAM message including a directory number associated with the remote switch and associated with a real time trunk allocation function.

27. The system for real time trunk member allocation of claim 24 wherein the means for transmitting a message requesting the establishment of a switch-to-switch call comprises:
   means for transmitting a SIP INVITE message including an address designating the remote switch.

28. The system for real time trunk member allocation of claim 24 wherein the means for transmitting a message requesting the establishment of a switch-to-switch call comprises
   means for transmitting a BICC IAM message including an address designating the remote switch.

29. The system for real time trunk member allocation of claim 28 wherein the means for transmitting a message requesting the establishment of a switch-to-switch call comprises
   means for transmitting a ATM UNI SETUP message.

30. A method for dynamic trunk member allocation, the method comprising:
   monitoring traffic volume between a local switch and a first remote switch;

determining that traffic volume between the local switch and the first remote switch justifies allocating additional trunk resources between the local switch and the first remote switch;

placing a switch-to-switch call between the local switch and the first remote switch, wherein placing a switch-to-switch call between the local switch and the first remote switch comprises one of: transmitting an ISUP IAM message from the local switch to the first remote switch or to an intervening network element, the ISUP IAM message including a directory number of the remote switch and a CIC number associated with the member, transmitting an SIP INVITE message from the local switch to the first remote switch, the SIP INVITE message including a network address of the remote switch and a CIC number associated with the member, transmitting a BICC IAM message from the local switch to the first remote switch, the BICC IAM message including a network address of the remote switch and a CIC number associated with the member and transmitting a BICC IAM message from the local switch to the first remote switch, the BICC IAM message including a network address of the remote switch and an ATM address associated with the resource; and, transmitting an ISUP UBL message in association with a CIC number related to the member, thereby marking a first member as available for use.

31. The method for dynamic trunk member allocation of claim 30 further comprising:

determining that the traffic volume between the local switch and the first remote switch no longer justifies allocating the additional trunk resources between the local switch and the first remote switch;

transmitting an ISUP BLO message in association with the CIC number related to the member, thereby marking the first member as unavailable for use; and, dynamically tearing down the first bearer path, thereby freeing the dynamically allocatable bearer resource for dynamic reallocation.

32. The method for dynamic trunk member allocation of claim 30 further comprising:

monitoring traffic volume between the local switch and a second remote switch;

determining that the traffic volume between the local switch and the second remote switch justifies allocating additional trunk resources between the local switch and the second remote switch;

placing a switch-to-switch call between the local switch and the second remote switch; and, transmitting an ISUP UBL message in association with a CIC number related to the member, thereby marking a second member as available for use.

* * * * *

UNITED STATES PATENT AND TRADEMARK OFFICE
CERTIFICATE OF CORRECTION

| | | |
|---|---|---|
| PATENT NO. | : 7,639,664 B2 | Page 1 of 1 |
| APPLICATION NO. | : 10/449521 | |
| DATED | : December 29, 2009 | |
| INVENTOR(S) | : Clark et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1947 days.

Signed and Sealed this

Twenty-first Day of December, 2010

David J. Kappos
*Director of the United States Patent and Trademark Office*